US012060060B1

(12) United States Patent
Costantino et al.

(10) Patent No.: US 12,060,060 B1
(45) Date of Patent: Aug. 13, 2024

(54) VEHICLE CONTROL USING TRAJECTORY CLUSTERING AND REACTIVE PREDICTION

(71) Applicant: Zoox, Inc., Foster City, CA (US)

(72) Inventors: Adrian Michael Costantino, Foster City, CA (US); Rasmus Fonseca, Boulder Creek, CA (US); Liam Gallagher, San Francisco, CA (US); Marin Kobilarov, Baltimore, MD (US); Mark Jonathon McClelland, San Francisco, CA (US); Yunpeng Pan, Newark, CA (US)

(73) Assignee: Zoox, Inc., Foster City, CA (US)

( * ) Notice: Subject to any disclaimer, the term of this patent is extended or adjusted under 35 U.S.C. 154(b) by 361 days.

(21) Appl. No.: 17/463,464

(22) Filed: Aug. 31, 2021

(51) Int. Cl.
*B60W 30/095* (2012.01)
*G06F 16/28* (2019.01)

(52) U.S. Cl.
CPC ....... *B60W 30/0956* (2013.01); *G06F 16/285* (2019.01); *B60W 2554/4041* (2020.02); *B60W 2554/4042* (2020.02); *B60W 2554/4043* (2020.02); *B60W 2554/4044* (2020.02); *B60W 2556/10* (2020.02)

(58) Field of Classification Search
CPC ..... B60W 30/0956; B60W 2554/4041; B60W 2554/4042; B60W 2554/4043; B60W 2554/4044; B60W 2556/10; G06F 16/285
USPC .......................................................... 701/26
See application file for complete search history.

(56) References Cited

U.S. PATENT DOCUMENTS

| | | | | |
|---|---|---|---|---|
| 10,156,850 | B1* | 12/2018 | Ansari | B60W 30/0953 |
| 2018/0043886 | A1* | 2/2018 | Keller | B60W 40/04 |
| 2018/0112990 | A1* | 4/2018 | Fowe | G01C 21/3676 |
| 2019/0047555 | A1* | 2/2019 | Düring | B60W 30/09 |
| 2019/0072973 | A1* | 3/2019 | Sun | G05D 1/0221 |
| 2021/0001897 | A1* | 1/2021 | Chai | G06F 18/214 |

(Continued)

OTHER PUBLICATIONS

Subalalitha, Lecture 2 K Means Clustering, 2018, YouTube, https://www.youtube.com/watch?v=7wbdVK5fJFg, table at minute 9:10 (Year: 2018).*

(Continued)

*Primary Examiner* — Jelani A Smith
*Assistant Examiner* — George A Alcorn, III
(74) *Attorney, Agent, or Firm* — Lee & Hayes, P.C.

(57) ABSTRACT

The techniques discussed herein may comprise an autonomous vehicle guidance system that generates a group of candidate trajectories based at least in part on sensor data. This group of candidate trajectories is clustered into two or more clusters and one or more representative trajectories may be determined for each cluster. The representative trajectory may be one of the trajectories in the cluster or a separately determined trajectory that represents the trajectories in a cluster, such as a mean or median trajectory. The representative trajectory may be used to predict how a dynamic object would react to the representative trajectory. This prediction may be used to determine potentially different costs associated with the different trajectories of the cluster with which the representative trajectory is associated. These costs may include costs to induce following behavior by the autonomous vehicle and/or cost(s) associated with conditionally available roadway portions.

20 Claims, 7 Drawing Sheets

(56) References Cited

U.S. PATENT DOCUMENTS

| | | | |
|---|---|---|---|
| 2021/0272018 A1* | 9/2021 | Casas | G05B 13/0265 |
| 2022/0057803 A1* | 2/2022 | Sorin | G05D 1/0088 |
| 2022/0153296 A1* | 5/2022 | Yu | B60W 60/00274 |
| 2022/0176995 A1* | 6/2022 | Subramanian | B60W 30/08 |
| 2023/0081921 A1* | 3/2023 | Hawasly | B60W 60/0015 |
| | | | 701/26 |

OTHER PUBLICATIONS

Wang et al., Vehicle Trajectory Clustering Based on Dynamic Representation Learning of Internet of Vehicles, 2020, IEEE (Year: 2020).*

* cited by examiner

VEHICLE CONTROL USING TRAJECTORY CLUSTERING AND REACTIVE PREDICTION

BACKGROUND

Planning systems in vehicles, such as autonomous vehicles, may use information associated with objects in an environment and attributes of the environment to determine actions for navigating the vehicle through the environment. A vehicle control system may alter the vehicle's speed or heading to accomplish a mission, such as dropping off or picking up a passenger, and/or to take into account an object or environmental conditions that encroach on the vehicle's path to complete such a mission. Accounting for objects and environmental conditions and accurately controlling the vehicle's response is important for safety and effective vehicle navigation—vehicle movement that doesn't unjustifiably stop, stutter, or take excursions.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
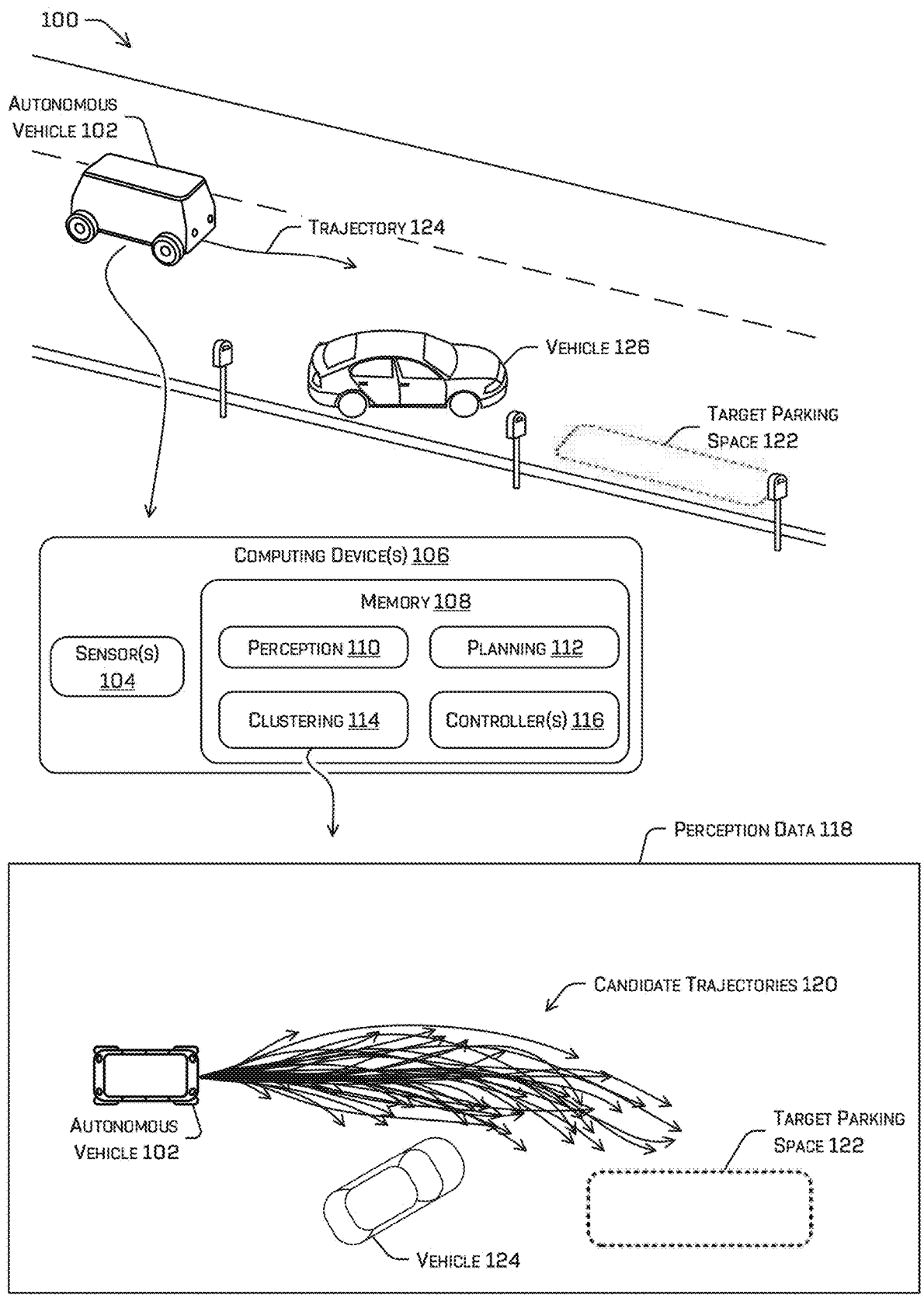
FIG. 1 illustrates an autonomous vehicle and an example scenario in which an autonomous vehicle generates a group of candidate trajectories for controlling motion of the autonomous vehicle in view of object(s) in the environment and various objectives.

As discussed above, correctly detecting what is in an environment is important for safely and efficiently navigating an autonomous vehicle through the environment. Issues with systems that control these functions may cause the autonomous vehicle to stutter or hesitate, stop when a human driver would be able to navigate a situation, need to transmit a request for help from a remote operator (or "teleoperator"), and/or cause a safety issue. This application relates to techniques for reducing the computational load (e.g., how much of a computing device and/or how many computing devices) and/or computational time associated with techniques that increase the number of scenarios the autonomous vehicle can safely and efficaciously navigate, e.g., without stopping, without stuttering, without the need to request help from a teleoperator, and/or that decrease a likelihood of an impact occurring. For example, the techniques discussed herein may decrease the occurrence of autonomous vehicle stops or stutters for normative situations such as traffic cones that have been knocked into the middle of a lane, when an object such as a vehicle is blocking part of two lanes, trash laying in the street, complex junctions with multiple vehicles and pedestrians, navigating in a gravel area with no lane markings, etc. and do so with reduced computational load and/or computational time.

The techniques discussed herein may comprise an autonomous vehicle guidance system that generates a group of candidate trajectories based at least in part on a static object map (e.g., a map indicating space occupied by static object(s) and/or "free space" in an environment) and/or one or more dynamic object maps (e.g., a map indicating a likelihood that a location in the environment will be occupied by a moving object or a stationary object that may move at a future time and/or cost(s) associated therewith) that are determined based at least in part on sensor data. A trajectory may specify a state of the vehicle over time, such as a position, heading, steering rate, velocity, and/or acceleration, for controlling motion of the vehicle. A planning component of an autonomous vehicle may determine tens of thousands, hundreds of thousands, or millions of these candidate trajectories for navigating a given scenario or even a particular time tick. Therefore, evaluating which candidate trajectory to select for implementation by the autonomous vehicle may be computationally and time intensive.

The techniques described herein may include a machine-learned (ML) model trained to receive these candidate trajectories as input and determine two or more clusters of these trajectories. In some examples, a trajectory may be transformed from a set of control instructions to a state and/or a state over time before being provided as input to the ML model. For example, the state may indicate a position, heading, velocity, or the like associated with a final state of the trajectory (e.g., the position, heading, velocity, etc. that would be accomplished by the vehicle by perfectly executing the trajectory) and/or a state of the trajectory over time (e.g., at multiple time stamps, such as at a current time or a time associated with the query, and time stamps at intervals up to a time horizon, such as 1 second, 4 seconds, 8 seconds, or the like).

A cluster may be a group identifier that associates two or more trajectories as being similar and being associated with a same representative trajectory. The representative trajectory may be one of the trajectories in the cluster or a separately determined trajectory that represents the trajectories in a cluster, such as a mean or median trajectory. In at least one example, the representative trajectory may be associated with a mean or median in the clustering/similarity space. For example, the similarity may be determined based at least in part on a difference (or differences) between positions, headings, velocities, accelerations, and/or the like associated with two different trajectories and this difference may be used as part of a k-means, k-medoids, or other clustering algorithm. In such an example, the representative trajectory may be a trajectory that is closest to the medoid associated with a cluster or it may be a trajectory that is determined based at least in part on the medoid of the cluster (e.g., the representative trajectory may have a position, heading, velocity, or the like defined by the medoid).

In some examples, after a planning component of the vehicle determines a cluster of trajectories, the planning component may determine a trajectory to represent that cluster—a representative trajectory. The representative trajectory may include a trajectory that is similar enough to the rest of the trajectories in the cluster that the driver of another vehicle, cyclist, pedestrian, or other dynamic object would react in the same or similar manner thereto in comparison to the rest of the trajectories. Determining the representative trajectory may be part of determining the cluster or determining the representative trajectory may be a process conducted after determining the cluster.

For example, in examples where the representative trajectory is determined as part of the clustering, the representative trajectory may be determined based at least in part on a medoid, such as when the clustering includes using a k-medoids technique to determine the cluster. The medoid (or mean for k-means) determined for a cluster during the k-medoids process may be used to determine the representative trajectory. In some examples, the medoid may indicate a position in a multi-dimensional space defining trajectories, such that the space defines different characteristics accomplished by a trajectory, such as position, heading, velocity, acceleration, steering rate, and/or the like. In some examples, the number of clusters determined by the techniques may increase according to a distance from an initial position of the vehicle. For example, the candidate trajectories determined within a first meter of the vehicle may be very similar and no clustering may be accomplished or two clusters may be used, but further out from the vehicle (e.g., from 1 to 3 meters or 2 to 5 meters), more clusters may be used (e.g., 3, 4, 5, 10), up to a maximum number of clusters (e.g., 5, 10, 15, 20, 50, 100 any other number). In some examples, the number may be determined based at least in part on perception data indicating a complexity of the environment (see U.S. patent application Ser. No. 17/184,559, filed Feb. 24, 2021, the entirety of which is incorporated by reference herein), a number of lanes or objects in the environment, or the like.

Determining which candidate trajectory to use may include determining a cost associated with a candidate trajectory. This may include detecting a static object and/or a dynamic object in the environment and determining first cost(s) associated with a candidate trajectory based at least in part on the static object(s) and second cost(s) based at least in part on dynamic object(s). In some examples, determining the second cost(s) based on dynamic object(s) may be more time, computation, and memory intensive than the first cost(s). Moreover, predicting how dynamic objects may respond to different candidate trajectories may be more time consuming than a dynamic object that may move in a certain way or stay in place regardless of what the autonomous vehicle does.

For example, the techniques discussed herein may include classifying a dynamic object as being a passive object or a reactive object. A reactive object may be likely (as measured by a confidence output by the ML model) to alter its movement in response to an action of the autonomous vehicle; whereas a passive object's movement may be unlikely to change based on a movement of the autonomous vehicle. In some examples, an ML model may classify a dynamic object as a reactive object or a passive object. The ML model may receive a track or at least a pose (e.g., position and/or orientation) associated with the autonomous vehicle, a track associated with the dynamic object, and/or sensor data associated with the dynamic object and may be trained to output a confidence score indicating a likelihood that an action of the dynamic object will be responsive to/affected by an action of the autonomous vehicle. A track may identify a historical, current, and/or predicted pose, velocity, acceleration, object classification (this may or may not be immutable—e.g., the classification "vehicle" is likely to be immutable, whereas "cyclist" may alter since a cyclist may dismount and become a pedestrian), etc. of a detected object. In some examples, if the confidence score determined by the ML model meets or exceeds a confidence threshold, the detected object may be classified as a reactive object; otherwise, the detected object may be classified as a passive object.

The techniques discussed herein may predict motion of a reactive object based at least in part on a representative trajectory. In other words, the techniques may include predicting how a dynamic object, classified as a reactive object, will react to the representative trajectory if the autonomous vehicle were to execute that trajectory. Once the prediction has been generated, this prediction may be associated with the other trajectories in the cluster with which the representative trajectory is associated, thereby reducing the computational time and load by obviating the need to generate a prediction for each trajectory. This prediction may be used to determine a cost associated with each candidate trajectory of the cluster. Such a cost may include a cost based on static object(s), passive dynamic object(s), reactive dynamic object(s), progress cost(s) (e.g., cost(s) (or rewards) associated with progress made along a route or deviations from the route or target lane), comfort cost(s), and/or other cost(s). In at least one example, the static object cost(s) may be based at least in part on a non-available roadway surface, such as a cyclist lane, a commuter lane, a parking lane, or the like—such a cost may induce the planning component to generally, if not always, select trajectories outside such a lane, except in instances where an impact with an object would otherwise occur (e.g., impact cost(s) may have such a high cost compared to a non-available road surface cost that the planning component may still use the non-available road surface in instances where an impact may occur). In some examples, the dynamic object cost(s) (passive and/or reactive) may include the following cost techniques discussed herein to induce the autonomous vehicle to maintain a time and/or distance gap between the autonomous vehicle and an object in the autonomous vehicle's line of travel.

The clustering and representative trajectory techniques discussed herein may drastically reduce the number of predictions determined by the planning component in evaluating the candidate trajectories, thereby reducing the compute and memory used and compute time for costing the candidate trajectories and determining a final trajectory for controlling the autonomous vehicle. The clustering techniques may additionally or alternatively increase the accuracy of predictions associated with reactive objects, such as by clustering a trajectory into multiple clusters and determining an aggregated cost map that accounts for multiple possible scenarios—in other words, the multi-cluster technique may improve the accuracy of the total cost associated with a candidate trajectory since it may reflect multiple predicted (and possible) future states rather than a single predicted future state. The parking lane cost(s) and following cost(s) discussed herein may improve the safety of the vehicle, prevent aberrant behavior, and make the vehicle's behavior more natural without hard-coding rules for this behavior, which would require extensive code that anticipates every possible permutation of situations—in other words, the costing techniques discussed herein induce, rather than directly control, vehicle behavior.

Example Scenario

FIG. 1 illustrates an example scenario 100 including a vehicle 102. In some examples, the example scenario 100 may be a real-world scenario and/or the example scenario 100 may be a representation of a real-world scenario modeled as a simulated scenario. In examples where the example scenario 100 is a simulated scenario, the example scenario 100 may be determined based at least in part on input received at a user interface of a computing device (e.g., a user of the computing device may define the environment, objects therein, and/or characteristics thereof) and/or the example scenario 100 may be based at least in part on log data received from one or more autonomous vehicles. The log data may be based at least in part on sensor data received at an autonomous vehicle, perception data generated by a perception component, and/or instructions generated by a planning component. In some examples, the autonomous vehicle may store the log data and/or periodically transmit the log data to a remote computing device.

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein and an example where scenario 100 is a real-world example (or is based on a real world scenario, such as by being based on log data), the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 104 on the vehicle 102 and in a simulation, one or more of sensor(s) 104 may be simulated. In some examples, the position of a simulated sensor may correspond with a relative position of one of the sensor(s) 104 to the vehicle 102.

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, clustering component 114, and/or controller(s) 116. In some examples, the planning component 112 may comprise the clustering component 114. The perception component 110, the planning component 112, the clustering component 114, and/or the controller(s) 116 may include one or more machine-learned (ML) models and/or other computer-executable instructions. In some examples, the controller(s) 116 may include instructions stored in a memory, although the controller(s) 116 may additionally or alternatively include a specialized computing device that comprises hardware and/or software for actuating drive components of the vehicle 102.

In general, the perception component 110 may determine what is in the environment surrounding the vehicle 102 and the planning component 112 may determine how to operate the vehicle 102 according to information received from the perception component 110. The perception component 110 may generate perception data 118, which may comprise data associated with static objects in the environment (static data) and/or data associated with dynamic objects in the environment (dynamic data). For example, the static data may indicate a likelihood that an object exists at a location in the environment and the dynamic data may indicate a likelihood that an object occupies or will occupy a location in the environment. In some instances, the dynamic data may comprise multiple frames associated with different times steps at intervals up to a prediction horizon (i.e., a maximum time/distance for which dynamic data is predicted). For example, the dynamic data may indicate a current position, heading, velocity, and/or the like associated with a dynamic object and at one or more future times.

The techniques discussed herein may additionally or alternatively comprise determining dynamic data based at least in part on a mode of operation of the vehicle. For example, the dynamic data may comprise a first prediction associated with a first vehicle mode and a first time and a second prediction associated with a second vehicle mode and the first time. The vehicle modes may include mission-level modes, such as passenger pickup, passenger transit, passenger drop-off, or the like; path or trajectory-level modes such as maintaining trajectory, slowing to a stop, transitioning lanes, executing a right hand turn, or the like; and/or signal modes, such as activating a speaker, activating a turn light, flashing headlights or high beams, or the like. The autonomous vehicle's behavior and signals may affect decisions and behavior made by other entities in the vicinity of the autonomous vehicle 102 and may thereby affect the predicted motion of other objects.

In some examples, the perception component 110 may receive sensor data from the sensor(s) 104 and determine data related to objects in the vicinity of the vehicle 102 (perception data), such as the static and/or dynamic data. The depicted example of the perception data 118 comprising static and/or dynamic data is a top-down representation of such data, but any representation of the static and/or dynamic data is contemplated, such as a heat map, object classifications associated with detected objects, instance segmentation(s), semantic segmentation(s), two and/or three-dimensional bounding boxes, tracks, etc. The perception component 110 may additionally or alternatively determine route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise radar data, which the perception component 110 may receive as input. The perception component 110 may be configured to detect as many objects and information about the environment as possible to avoid failing to account for an event or object behavior that should be taken into account by the planning component 112 in determining a trajectory for controlling motion of the vehicle.

The object classifications, which may be part of the perception data 118 determined by the perception component 110, may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. In some examples, the perception component 110 may comprise a prediction component that may determine the predicted portion of the track, which may comprise a predicted position, heading, steering rate, velocity, acceleration, classification (for those classifications that are malleable, such as cyclists that may become pedestrians), etc. The prediction component may comprise a simulation component, machine-learned model, or in additional or alternate examples, the prediction component may comprise a Kalman filter or the like. The perception component 110 may be used to determine the prediction, which may be part of the perception data 118.

In some examples, the perception component 110 may include an ML model trained to receive an object track as input and output a likelihood (e.g., a posterior probability) and/or a classification that indicates whether the (dynamic) object is a reactive object or a passive object. For example, the likelihood may indicate a likelihood that a dynamic object is a reactive object and a likelihood threshold may be used to indicate that an object is reactive. In an example where an object is classified as a reactive object, the prediction component may treat the reactive object differently than any object(s) classified as being passive objects. For example, the prediction component may use a passive object's previous track to determine a predicted position, heading, velocity, acceleration, etc. of the passive object, whereas the prediction component may use both a reactive object's track and a trajectory or candidate trajectory associated with the vehicle 102 to determine a predicted position, heading, velocity, etc. of the reactive object. In other words, the prediction component may use two different pipelines for the reactive objects and passive objects. The training data used to generate these pipelines in which ML is used may be different—the training data for the reactive ML model pipeline may include trajectory(ies) generated by vehicle 102 whereas the passive object pipeline may include a more simple kinematics-based model instead of an ML model or the ML model may be trained based on track(s) associated with dynamic objects without regard for trajectory(ies) generated by vehicle 102.

The data produced by the perception component 110 may be collectively referred to as perception data. Once/as the perception component 110 generates perception data, the perception component 110 may provide the perception data to the planning component 112. In some examples, perception data may comprise outputs of sensor specific pipelines (e.g., vision, lidar, radar) and/or hybrid sensor pipelines (e.g. vision-lidar, radar-lidar).

The planning component 112 may use the perception data received from perception component 110, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location, which may be based at least in part on a mission and map data, in at least one example. For a mission that includes picking up a passenger at one location and dropping the passenger off at another location (potentially with intervening waypoints), the planning component may determine a route that specifies the roadways or roadway portions to accomplish the mission. The depicted example includes a near-end of a mission where the planning component 112 has determined to a route that terminates on a block depicted in scenario 100 and the planning component 112 has refined the route to specify a specific parking spot (target parking space 122) to use to drop off a passenger based on prediction data that might indicate that the other parking spaces are being used.

The planning component may determine, based at least in part on perception data and/or the route, a plurality of candidate trajectories 120 for controlling motion of the vehicle 102 in accordance with a receding horizon technique (e.g., 1 micro-second, half a second, 2 seconds, 5 seconds, 10 seconds, or any other near-term time period) to control the vehicle to traverse the route (e.g., in order to avoid any of the detected objects); and select one of the candidate trajectories as a trajectory 124 that may be used to generate a drive control signal that may be transmitted to the controller(s) 116 for actuating drive components of the vehicle 102. For example, the planning component 112 may determine the candidate trajectories 120 based on the target parking space 122 (which may determine based on the route and/or perception data) and the existence of a vehicle 126 identified in the perception data 118 that is leaving a parking space. FIG. 1 depicts an example of the trajectory 124 that may ultimately be selected from among the candidate trajectories 120 according to the techniques discussed herein, represented as an arrow indicating a target heading, target steering angle, target steering rate, target position, target velocity, and/or target acceleration for the controller(s) to track, although the trajectory itself may comprise instructions for controller(s), which may, in turn, actuate a drive system of the vehicle 102. Note that, although tens of trajectories are depicted in the example shown above and that only trajectories originating at the vehicle 102 are shown, in some examples, thousands or millions of trajectories may be determined by the planning component 112 and multiple trajectories may be concatenated together over a time horizon to form a path (see U.S. patent application Ser. No. 17/394,334, filed Aug. 4, 2021, the entirety of which is incorporated by reference herein). For example, a first trajectory may be selected from among a first set of candidate trajectories to control the vehicle 102 for t=0 to t=2 seconds, a second trajectory may be selected from among a second set of candidate trajectories to control the vehicle 102 for t=2 seconds to t=4 seconds, and so on until a time horizon is met (e.g., 5 seconds, 8 seconds, 10 seconds). Although an interval of two seconds is used in the example above, any other interval may be used (e.g., 10 milliseconds, 100 milliseconds, 500 milliseconds, 1 second, 2 seconds, 5 seconds). In such an example, the second set of candidate trajectories may be generated based at least in part on the first set of candidate trajectories and/or the first trajectory such that a continuous path may be generated. In other words, the second trajectory may start where the first trajectory ends and may be associated with a velocity, heading, steering rate, acceleration, etc. that is continuous with the first trajectory.

As discussed in more detail below, the clustering component 114 may determine cluster(s) based at least in part on the candidate trajectories 120 to reduce an amount of compute and/or compute time to determine the trajectory 124 from among the candidate trajectories 120. In some examples, the number of clusters determined by the clustering component 114 may increase with distance from the vehicle 102 and/or time into the future. For example, in the example discussed above a first number of clusters may be used for the first set of candidate trajectories for controlling the vehicle 102 from t=0 to t=2 and a second number of clusters (greater than the first number of clusters) may be used for the second set of candidate trajectories for controlling the vehicle 102 from t=2 to t=4.

Example System

Figure 2:
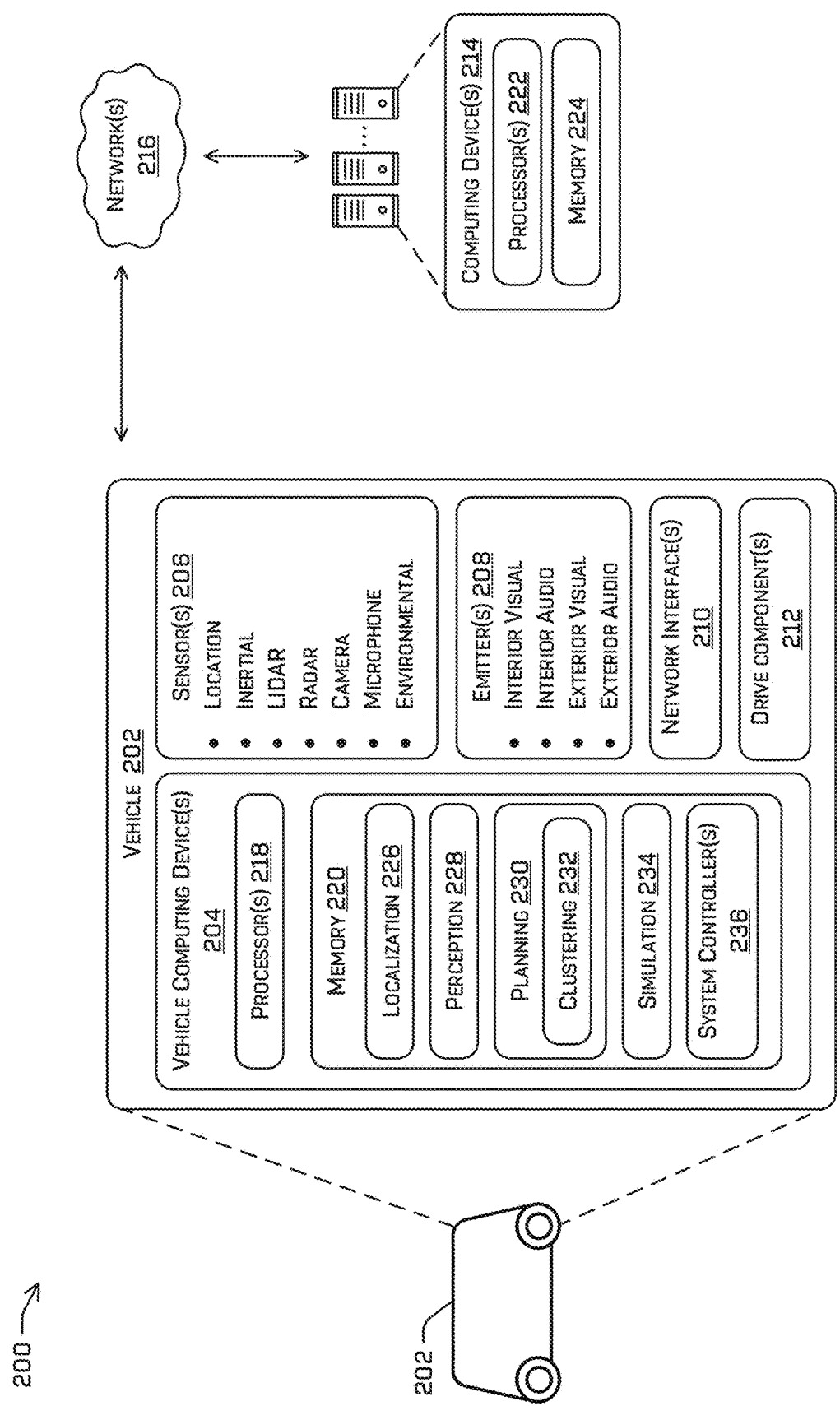
FIG. 2 illustrates a block diagram of an example autonomous vehicle architecture comprising a guidance system for path planning.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, clustering component 232, simulation component 234, and/or system controller(s) 236—zero or more portions of any of which may be hardware, such as GPU(s), CPU(s), and/or other processing units. Perception component 228 may represent perception component 110, planning component 230 may represent planning component 112, and clustering component 232 may represent clustering component 114.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. For example, the prediction component may be the simulation component 234 although, in an additional or alternate example, the prediction component and the simulation component 234 may be separate components. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 228 may include a prediction component that predicts actions/states of dynamic components of the environment, such as moving objects. In some examples, the perception component 228 may include the simulation component 234 as part of the prediction portion of the perception component 228. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 230 may comprise hardware/software-in-a-loop in a simulation (e.g., for testing and/or training the planning component 230), the planning component 230 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

In some examples, in order to generate a path, which may comprise multiple contiguous trajectories (e.g., one trajectory begins where another one ends, including a continuous heading, velocity, acceleration, etc.), the planning component 230 may execute a tree search and may determine action node(s) and/or prediction node(s) of the tree search by transmitting a request for the planning component to generate candidate action(s) based at least in part on an environment determined in association with a prediction node. The planning component 230 may receive an initial state of the environment from the perception component 228 (i.e., in association with a root node of the tree search), which the planning component 230 may use to determine one or more candidate actions for a first time period (e.g., 0 to 1 second, 0 to 2 seconds, 0 to 0.5 seconds in the future). For example, the tree search may include executing a Monte-Carlo tree search (MCTS); partially observable Monte-Carlo planning (POMCP); Markov decision process (MDP), such as a partially observable MDP (POMDP); or the like.

The planning component 230 may transmit at least one of these one or more candidate actions to the simulation component 234 and/or a prediction component of the perception component 228, which may determine a predicted state of the environment that is based at least in part on the a representative trajectory, as discussed further herein. This process may be iterated until a time horizon, distance, progress along a route, target position, and/or suitable path is reached/determined. For example, after determining a prediction of a future state of the vehicle and the environment (including any dynamic objects, whether reactive or passive) at the end of the first time period (e.g., 1 second in the future, 2 seconds, 0.5 seconds), the planning component 230 may determine a second set of candidate actions for a second time period (e.g., 1 to 2 seconds, 2 to 4 seconds, 0.5 to 1 second in the future) based at least in part on a previous candidate action chosen and/or prediction associated therewith.

For example, the time horizon may be a length of time into the future from a current time (e.g., 500 milliseconds, 1 second, 2, seconds, 5 seconds, 8 seconds, 10 seconds). This length of time may be associated with controlling the vehicle for the next m units of time, where m is a positive integer.

A distance may define a total distance covered by the constituent actions that make up a path, whereas progress along a route may be the displacement along/with reference to a route. In an additional or alternate example, a target position may be used to terminate the tree search. For example, upon determining a path that reaches the target position in the environment, the tree search may output that path and terminate. In an additional or alternate example where the guidance system is used when a nominal planning component failed to create a valid trajectory or path, the planning component 230 may terminate upon determining a valid path (e.g., a path that is impact-free and conforms to a rule set, which may specify comfort metrics, conformance to laws, etc.). In additional examples, iterations may continue until an objective is achieved (e.g., a successful lane change, a successful merge, or any other completed action). In any one or more examples, any combination of the above may further be used as decision points for branching the tree. Additional details regarding the tree search are discussed in U.S. patent application Ser. No. 17/394,334, the entirety of which is incorporated herein.

The simulation component 234 may operate on the vehicle 202 and/or on the computing device(s) 214. The simulation component 234 may determine a simulation of the environment and/or the vehicle 202, such as simulating execution of a candidate action by the vehicle 202 and a predicted state of the environment based at least in part on the passage of time and responsive to execution of the candidate action by the vehicle 202. For example, the simulation may comprise a representation of a position, orientation, movement, and/or quality of portions of the environment and/or the vehicle 202. The environment may comprise an agent, such as another vehicle, a pedestrian, vegetation, a building, signage, and/or the like.

The simulation component 234 may receive a candidate action and an environment state (which may be a current environment state determined by the perception component 228 or a predicted environment state determined by a prediction component of the perception component 228 or by the simulation component 234) from the planning component 230 to determine the simulation data, which may be a two or three-dimensional representation of the scenario. The simulation data may be used to instantiate and execute a simulation. The candidate action may be used to control motion of a simulation of the vehicle 202 during execution of the simulation. A three-dimensional representation may comprise position, orientation, geometric data (e.g., a polygon representation, a digital wire mesh representation) and/or movement data associated with one or more objects of the environment and/or may include material, lighting, and/or lighting data, although in other examples this data may be left out. In an additional or alternate examples, the simulation component 234 may comprise a computational construct (e.g., an algorithmic and/or mathematical representation used by a computing device in performing the operations described that is not intended to be (and/or incapable of being) visualized).

The scenario data may comprise a two-dimensional representation of an environment associated with a scenario, objects contained therein, and characteristics associated therewith, all of which may be part of a scenario associated with the log data. For example, the scenario data may identify a position of an object, an area occupied by the object, a velocity and/or acceleration associated with the object, whether the object is static or dynamic, an object type associated with the object (e.g., a classification such as "pedestrian," "bicyclist," "vehicle," "oversized vehicle,"

"traffic light," "traffic signage," "building," "roadway," "crosswalk," "sidewalk"), and/or other kinematic qualities associated with the object and/or the object type (e.g., a friction coefficient, an elasticity, a malleability). As regards the environment itself, the scenario data may identify a topology of the environment, weather conditions associated with the environment, a lighting state (e.g., sunny, cloudy, night), a location of light sources, and/or the like. In some examples, topology, fixed object (e.g., buildings, trees, signage) locations and dimensions, and/or the like associated with the scenario data may be generated based at least in part on map(s). In some examples, the scenario data may be used (e.g., by the simulation component 234) to instantiate a three-dimensional representation of the object and/or the simulated environment may be instantiated based at least in part on map data (e.g., which may define a topology of the environment; the location and/or dimensions of fixtures such as signage, plants, and/or buildings) and/or the scenario data.

Additionally or alternatively, the simulation may include a simulated object that is controlled by an agent behavior model as discussed in more detail in U.S. patent application Ser. No. 16/889,747, filed Jun. 1, 2020, the entirety of which is incorporated by reference herein, in addition to or instead of a nominal prediction component of the simulation component or a prediction component of the perception component 110. The agent behavior model may control simulated motion of a simulated representation of a dynamic object, such as a reactive dynamic object. In some examples, the simulation may be executed as part of a forecasting/prediction operation, so one or more simulations may be executed to determine a prospective scenario (e.g., predicted environment state data) based on a candidate action generated according to the tree search discussed herein.

In some examples, a simulated sensor may determine simulated sensor data based at least in part on a simulation executed by the simulation component 234. For example, U.S. patent application Ser. No. 16/581,632, filed Sep. 24, 2019 and the entirety of which is incorporated by reference herein, discusses this in more detail. In an additional or alternate example, the simulation executed by the simulation component may itself comprise simulated sensor data. The perception component 228 (e.g., a copy thereof, which may comprise software and/or hardware, which may include hardware-in-the loop simulation) may receive such sensor data and/or simulated sensor data may output perception data that is provided as input to the planning component 230. The planning component may use the perception data to determine instructions for controlling motion of the vehicle 202, which may be used to control at least the simulated representation of the vehicle 202 in the simulation and, in some examples, may be additionally used to control real-world motion of the vehicle 202, such as in examples wherein the simulation component 234 executes on-vehicle during real-world operation.

In some examples, the simulation component 234 may additionally or alternatively store a ruleset and may determine whether a candidate action passed or failed a scenario based at least in part on the ruleset. The ruleset may be associated with and/or include operating constraint(s). In some examples, the ruleset may be part of or replaced by an event detection system (U.S. patent application Ser. No. 16/682,971, filed Nov. 13, 2019, the entirety of which is incorporated by reference herein) and/or a impact monitoring system (U.S. patent application Ser. No. 16/703,625, filed Dec. 4, 2019).

The simulation component 234 may comprise ML model trained to classify dynamic objects detected by the perception component 228 as being reactive or passive. In at least one example, the classification need not be binary and may be a score, such as a number between 0 and 1, where 0 indicates that an object is passive and a 1 indicates that an object is reactive. In some examples, this ML model may receive a track associated with a dynamic object and a candidate action of the vehicle as input and may determine whether the dynamic object is passive or reactive according to a binary classification or a regression, as discussed above. A purely passive agent will not change its behavior at all based on the behavior of the vehicle 202/the candidate action, whereas an action taken by a reactive object is highly likely to be affected by action(s) of the vehicle 202. In an additional or alternate example, the ML model may determine a likelihood (e.g., a covariance, a posterior probability) that a dynamic object will modify an action associated therewith based on an action of the vehicle 202. Dynamic objects associated with a likelihood meeting or exceeding a threshold likelihood may be classified as being reactive, whereas another dynamic object associated with a likelihood that doesn't meet the threshold may be classified as a passive object.

In some examples, training the ML model to classify a dynamic object as a reactive object or passive object may comprise receiving log data from the vehicle, which may include perception data and trajectory(ies) implemented by the vehicle. The perception data may identify a dynamic object and/or data related thereto, such as a track associated with the dynamic object. To identify a label or yielding score identifying that a dynamic object was reactive to the vehicle's actions, a computing device may determine a correlation score based on changes in the dynamic object track over time relative to the trajectory implemented by the vehicle. In some examples, a filter may be applied to the dynamic objects in the log data to restrict out dynamic objects that are unlikely to be modifying their behavior based on the vehicle's behavior. For example, the filter may remove dynamic objects that are located at a distance from the vehicle greater than a threshold distance (based on the dynamic objects speed, in some instances), a heading of the dynamic object, and/or the like.

The predicted state of the environment may be determined by a prediction component of the perception component 228 and/or the simulation component 234 based at least in part on whether any dynamic object(s) in the environment are classified as being reactive. A predicted state of a reactive object may be simulated by the simulation component 234 whereas a predicted state of a passive object may be determined by a prediction component of the perception component 228, such as a Kalman filter for such predictions or other simple propagation of a current state of the passive object (e.g., dead reckoning). The passive object prediction component may use less compute, whereas the dynamic object prediction component (e.g., the simulation component 234) may, in some instances, require more compute.

The memory 220 and/or 224 may additionally or alternatively store a mapping system, a planning system, a ride management system, etc. Although perception component 228, planning component 230, and/or simulation component 234 are illustrated as being stored in memory 220 and/or 224, perception component 228, planning component 230, clustering component 232, and/or simulation component 234 may include processor-executable instructions, machine-learned model(s) (e.g., a neural network), and/or hardware.

As described herein, the localization component 226, the perception component 228, the planning component 230, clustering component 232, simulation component 234, and/or other components of the system 200 may comprise one or more ML models. For example, localization component 226, the perception component 228, the planning component 230, clustering component 232, and/or simulation component 234 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, the entirety of which is incorporated by reference herein), and/or VoxelNet. Architecture latency optimizations may include MobilenetV2, Shufflenet, Channelnet, Peleenet, and/or the like. The ML model may comprise a residual block such as Pixor, in some examples.

Clustering component 232 may, more specifically, comprise a k-means, k-medoids, k-nearest neighbor, or embedding model, such as t-distributed stochastic neighbor embedding (t-SNE), or a hierarchical clustering model. The clustering component 232 may receive a set of candidate trajectories as input. In some examples, a pre-processing step before the set of candidate trajectories are provided as input may comprise transforming a candidate trajectory from a set of instructions suitable for the system controller(s) to an n-dimensional tensor or other high-dimensional representation, where n is a positive integer equal to (or less than, if clustering is occurring over less than all the characteristics) the number of characteristics controlled by a trajectory. As discussed further herein, the clustering component 232 may be trained to output k number of clusters (e.g., associate a candidate trajectory with a specific cluster and/or a confidence/weight that indicates a suitability of that cluster for that candidate trajectory), where k may be predefined or may be based at least in part on a speed of the vehicle and/or the time horizon.

In some examples, k may increase as set(s) of candidate trajectories get further from an original position of the vehicle. For example, a first number of clusters (e.g., 2, 3, 5 10) may be used for a first group of candidate trajectories generated to control the vehicle over a first time period (e.g., 0 seconds to 0.5 seconds), a second number of clusters (e.g., 5, 9, 10, 20, 25) may be used for a second group of candidate trajectories generated to control the vehicle over a second time period (e.g., 0.5 seconds to 1 second), a third number of clusters (e.g., 15, 20, 25, 27, 50) may be used for a third group of candidate trajectories generated to control the vehicle over a third time period (e.g., 1 second to 1.5 seconds), and so on. A fixed number of clusters, the rate at which the number of clusters increases, and/or the maximum number of clusters used may be based at least in part on a number of objects in the environment, a speed of the vehicle, a complexity of the environment, a shape of the roadway, a similarity determined between trajectories of a same cluster, and/or other perception data discussed herein. For example, the number of clusters may increase as the number of objects increases, the speed increases, the complexity increases, a junction complexity increases, a similarity of the trajectories in a cluster decreases, and/or roadway shape increases in curvature or number, and/or other perception data discussed herein indicates similar data that may cause the candidate trajectories to vary from each other.

Memory 220 may additionally or alternatively store one or more system controller(s) (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 230 may generate instructions based at least in part on perception data generated by the perception component 228, such as according the techniques discussed herein that reduce the compute and/or compute time to determine a trajectory to control the vehicle 202, and transmit the instructions to the system controller(s), which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Figure 3A:
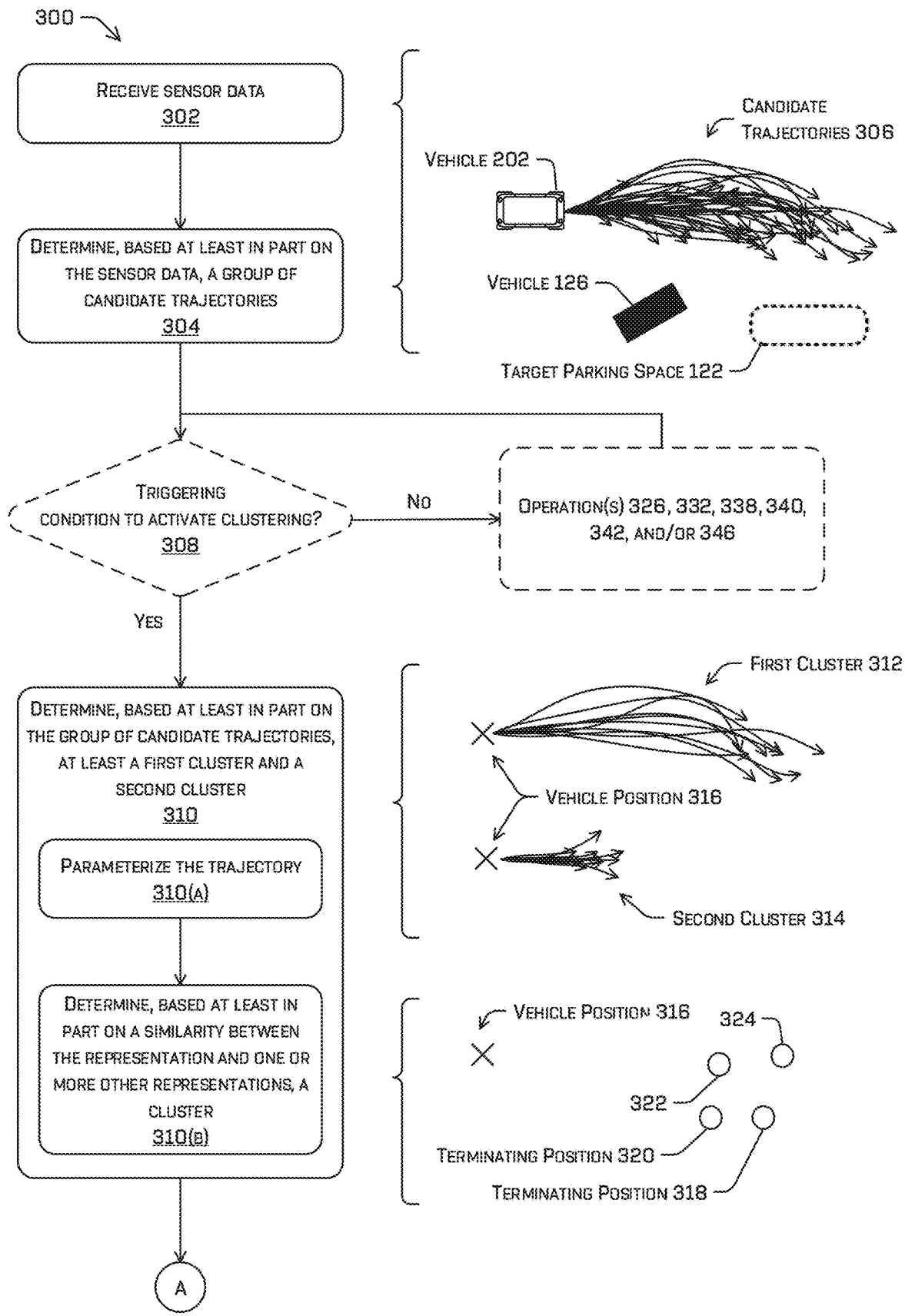
FIGS. 3A-3C illustrate a pictorial flow diagram of an example process for generating a path for controlling an autonomous vehicle using clustering and representative trajectory determination to reduce the time and/or computational load for determining cost(s) associated with dynamic object(s).
Figure 3B:
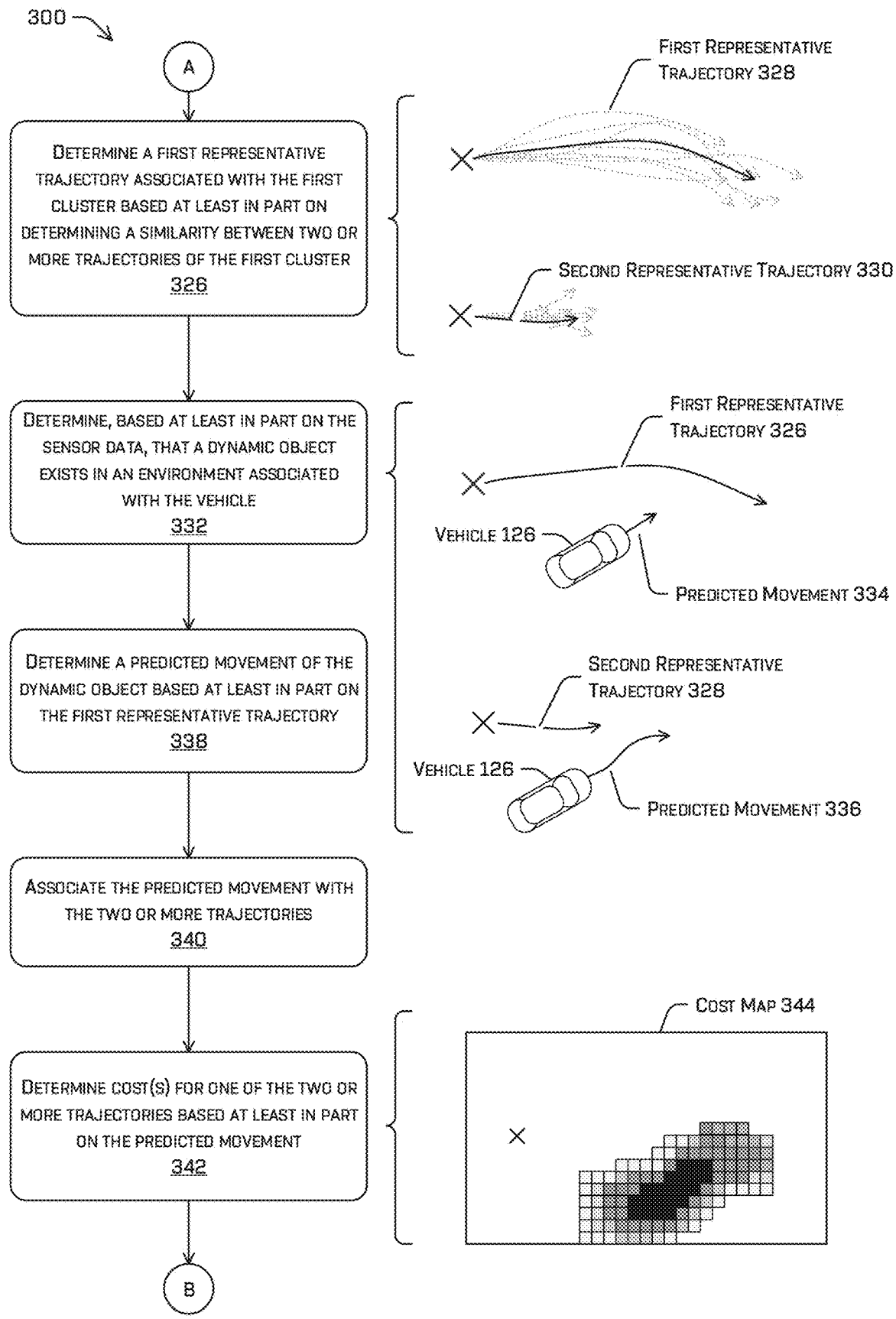
Figure 3C:
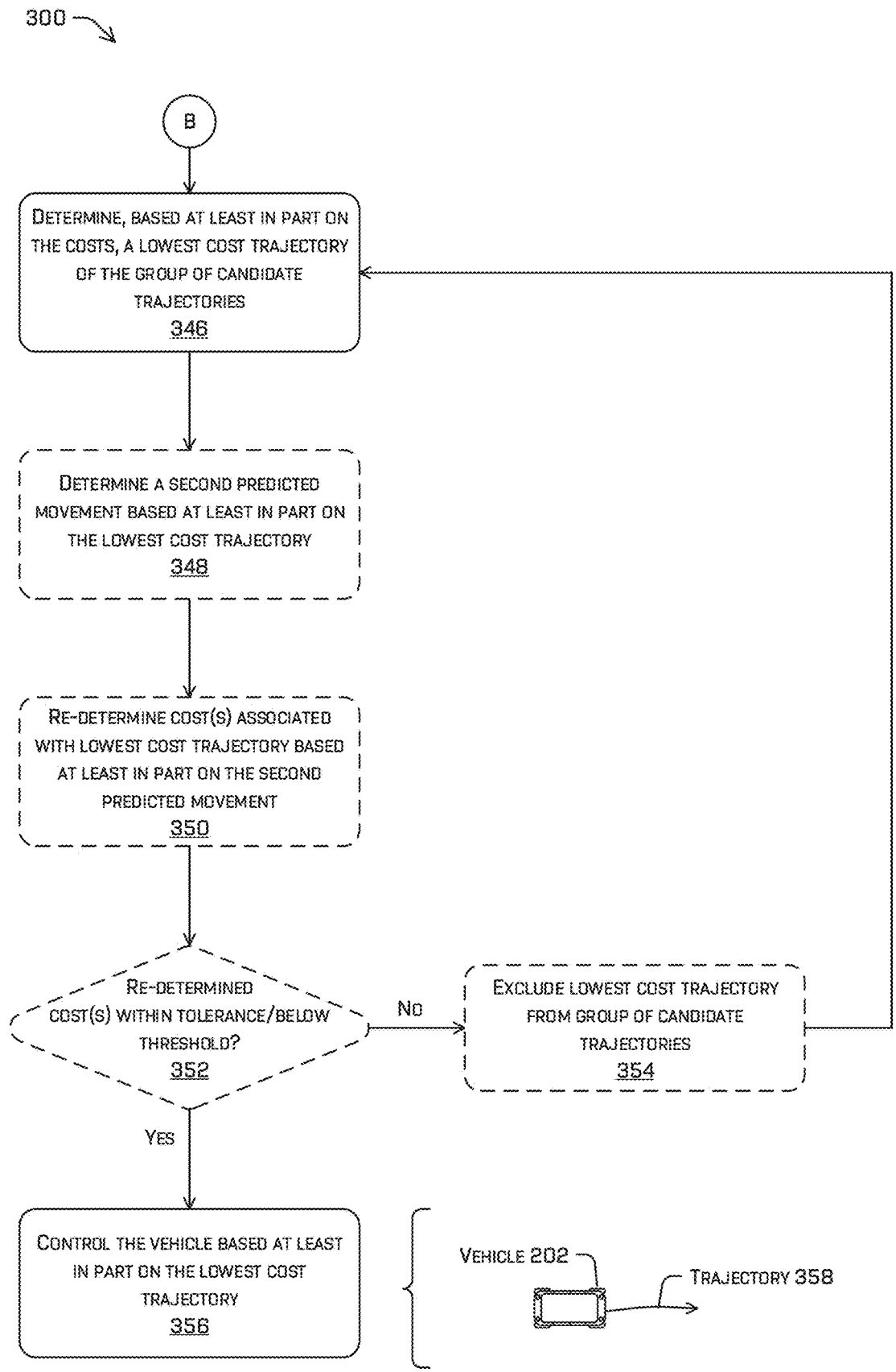

Example Path Generation Using a Clustering Technique to Reduce Compute and/or Compute Time FIGS. 3A-3C illustrate a pictorial flow diagram of an example process 300 for generating a path for controlling a vehicle (e.g., vehicle 202) using clustering and representative trajectory determination to reduce the time and/or computational load for determining cost(s) associated with dynamic object(s). The example process 300 may be part of a technique for determining a path (multiple contiguous trajectories) for controlling the vehicle.

At operation 302, example process 300 may comprise receiving sensor data from one or more sensors, according to any of the techniques discussed herein. The sensor(s) may be associated with the vehicle and/or another computing device. Operation 302 may additionally or alternatively comprise determining perception data, as discussed above, based at least in part on the sensor data. In some examples, the perception component may determine the perception data and, for any dynamic objects detected by the perception component, an ML model trained to classify dynamic object(s) as reactive or passive may determine whether the dynamic object is reactive or passive (or a score associated therewith, as discussed above). The perception data may be associated with a most recently received set of sensor data (e.g., a current time, although there may be a small delay between receiving the sensor data and determining the perception data).

In the depicted example, the perception data may include an indication of a position, heading, and/or other characteristics (e.g., velocity, acceleration, steering rate, object classification) of the vehicle 126, which may include an indication, in this instance, that the vehicle 126 is a reactive object. Note that although the perception data is represented as a two-dimensional top-down representation, in additional or alternate examples, the perception data may comprise a data structure, such as a pub-sub message, a three-dimensional representation, and/or the like. In some examples, the perception data may further comprise a prediction of whether an occluded object exists, as discussed in more detail in U.S. patent application Ser. No. 16/407,139, filed May 8, 2019, the entirety of which is incorporated by reference herein, or similar thereto. In an additional or alternate example, the prediction of whether an occluded object exists may be determined by a machine-learned model that receives the environment state data as input and outputs a field of likelihoods. Any region of the environment associated with a likelihood that meets or exceeds a threshold may be output as a potential false negative, which may be used as part of the candidate action generation.

At operation 304, example process 300 may comprise determining, based at least in part on the sensor data (e.g., via the perception data), determining a group of candidate trajectories 306. Note that the illustrated group of candidate trajectories 306 may be a first group of candidate trajectories generated based on a current state of the vehicle 202 (e.g., current position, heading, velocity, acceleration, curvature parameters (e.g., coefficients or other parameters of a parabolic, polynomial, or other type of equation defining a curve for the vehicle to follow), controls state). However, it is understood that the technique discussed herein may be applied to a subsequent cluster of trajectories that may be generated based at least in part on a final state indicated by a candidate trajectory that is chosen from among the first group of trajectories. In other words, such a second group of candidate trajectories may be based at least in part on the state specified by a candidate trajectory that was selected, such as according to a tree search algorithm like MCTS and/or POMDP.

In some examples, determining a candidate trajectory may be based at least in part on a lane reference type, a target type, an expansion variable, an offset, a multiplier, and/or a propensity type. The lane reference type may be an indication of whether a lane reference for generating the candidate action should be generated using sensor data or using a predefined lane reference, such as may be indicated in a pre-generated map. A lane reference may or may not be associated with a center of the lane. For example, the lane reference may be a center of the lane for a straight lane portion, but on curves the lane reference may be biased toward the inside or outside of the curve.

The target type may define an action type for accomplishing the current route or mission. For example, the target type may specify a current lane of the vehicle, an adjacent lane, a parking space, a position in free space (e.g., where no lane markings exist), or the like. The illustrated example depicts a target parking space 122, for instance.

The expansion variable may identify a weight, distance, factor, and/or other bounds on how far laterally (and/or longitudinally in some examples) unoccupied space can be explored (e.g., how far laterally candidate actions can take the vehicle). For example, the expansion variable may be a general constraint for how different the candidate actions may be.

The offset may identify a predetermined distance from the lane reference by which to iterate exploration of candidate actions. The distance may additionally or alternatively be determined dynamically based at least in part on sensor data, such as a speed of the vehicle, a complexity of the environment (see U.S. patent application Ser. No. 17/184,559, filed Feb. 24, 2021, the entirety of which is incorporated by reference herein), or the like. For example, where the offset is non-zero, determining the candidate action may comprise determining a trajectory by drawing a curve, Bezier, gradient, or the like bounded according to smoothness constraints associated with comfort metrics and/or steering capabilities of the vehicle from a starting position to a position on the offset reference, whereas an offset of zero would be a trajectory that tracks the lane reference itself.

The multiplier may be a factor between 0 and 1, which may be multiplied by the current maximum speed allowed by the law to determine the maximum speed associated with the candidate action. The multiplier may be randomized, varied according to a pattern, and/or may be constrained based at least in part on bounds set by the planning component based at least in part on the environment state data and the previous trajectory of the vehicle.

The propensity type may identify curvature, velocity, and/or acceleration constraints associated with different behavior types, such as "assertive," which may be associated with higher curvature, velocity, and/or acceleration and which may be required when the perception component detects a complex environment or other assertive traffic; "nominal" which may provide a baseline for typical interactions with other agents; "conservative;" and/or "submissive." The perception engine and/or the planning component may work together to determine the propensity type to be used, as discussed in more detail in U.S. patent application Ser. No. 17/006,679, filed Aug. 28, 2020, the entirety of which is incorporated by reference herein.

Operation 308 may be an additional or alternate operation in some examples. At operation 308, example process 300 may comprise determining whether a triggering condition has been satisfied to trigger the clustering technique. In some examples, the clustering technique discussed herein, such as operations 310 and 326 may not occur until an m-th control time period and/or until a candidate trajectory is generated that indicates a final position that is x meters from the vehicle, where m is a positive integer greater than 1 and x is a real number greater than 0. In yet another example, the planning component may determine a representative trajectory associated with the candidate trajectories generated for a first time period, treating all of the trajectories as being one cluster, in essence—i.e., conducting a slightly modified version of operation(s) 326 (in an example where the group of candidate actions are treated as one cluster and a representative trajectory is determined in association therewith), 332, 338, 340, 342, and/or 346. In at least one example, operation 308 may comprise determining a similarity between the group of candidate trajectories and, if the similarity indicates that the trajectories are similar (e.g., the similarity meets or exceeds a threshold) operation 308 may continue along the "No" path, which may comprise determining a single representative trajectory for the group of candidate trajectories In at least one example, determine a candidate trajectory may comprise sampling a vehicle state space, which may include a space indicating vehicle position, velocity, general intermediate mission (e.g., turn, don't turn, follow car, enter parking space), and/or heading and determining the trajectory may comprise determining an acceleration and/or steering rate that accomplishes the vehicle position, velocity, and/or heading with minimum jerk. In some examples, the vehicle state space may be sampled based at least in part on intermittent points (e.g., every 0.1 meters, every 0.5 meters, every 0.1 seconds, every 0.5 seconds, every 1 second) and/or around (e.g., at and within a predefined distance of) goal points, such as a portion of a route, a parking space, a lane, or the like.

In yet another example, the clustering technique may not be executed until the planning component determines that a cost associated with a default action is greater than a threshold. The default action may include, for example, executing the last trajectory executed by the vehicle 202 (e.g., maintain a velocity, heading, steering rate, velocity, acceleration, and/or the like), following an object, or the like. If the triggering condition hasn't been detected by the planning component as having occurred yet, example process 300 may skip to operation(s) 326, 332, 338, 340, 342, and/or 346. In some examples, the triggering condition may be that the candidate trajectories were generated for an m-th time period, where m is 2, 3, 4, 5, or another number greater than 1. For example, a first (m=1) set of candidate trajectories may be generated by the planning component in association with controlling the vehicle over a first time period and a second (m=2) set of candidate trajectories may be associated with a second time period after the first time period. For example, the first time period may be from a current time to 0.5 seconds, 1 second, or 2 seconds in the future (any other period is contemplated and may depend on the control time horizon) and the second time period may be from 0.5 seconds, 1 second, or 2 seconds in the future, depending on when the first time period ended, to 1 second, 2 seconds, or 4 seconds in the future, respectively. To keep the discussion simple, the discussion assumes that clustering occurs for the first time period. In additional or alternate examples, the number of clusters, k, may increase with m or may increase in a stepwise fashion—for example, k may stay fixed for a certain number or range of m, and/or k may increase at a specified rate for a range of m, and/or may be another fixed number at a different range of m. For example, the candidate trajectories determined within a first meter of the vehicle may be very similar and no clustering may be accomplished or two clusters may be used, but further out from the vehicle (e.g., from 1 to 3 meters or 2 to 5 meters), more clusters may be used (e.g., 3, 4, 5, 10), up to a maximum number of clusters (e.g., 5, 10, 15, 20, 50, 100 any other number).

At operation 310, example process 300 may comprise determining, based at least in part on the group of candidate trajectories, at least a first cluster and a second cluster. For example, operation 310 may be accomplished by an embedding model; hierarchical embedding model; and/or k-means, k-medoids, k-nearest neighbor, nearest centroid/Rocchio (which may be used for a subsequent candidate trajectory that might be generated after clustering, such as when a tree search may return to a former node (after a partial path ends up being blocked or the like) or as part of an iterative trajectory generation technique). A cluster may be an association or common identification of a subset of the group of trajectories with a cluster identifier and a representative trajectory. FIG. 3A depicts a first cluster 312 comprising a first subset of the candidate trajectories 306 and a second cluster 314 comprising a second subset of the candidate trajectories 306. A vehicle position 316 of the vehicle 202 is depicted as an "x" for a frame of reference. Put simply and without the technical features, a cluster may indicate that the trajectories associated therewith are similar.

Operation 310 may additionally or alternatively comprise operation(s) 310($a$) and 310($b$). Operation 310($a$) may comprise parameterizing the trajectory. In other words, operation 310($a$) may be a pre-processing operation to transform the trajectories from control instructions to a form suitable for use by the ML model. For example, a candidate trajectory may be transformed into a tensor or vector that represents the controls indicated by the candidate trajectory. This may comprise converting a vehicle state and/or controls sufficient to accomplish an intermediate (e.g., at a time step before a final time associated with the candidate trajectory) or final (e.g., at a time step at the end of the time period associated with the candidate trajectory) position, heading, acceleration, velocity, steering rate, or the like to a vector or tensor representation of that position, heading, etc.

Operation 310($b$) may comprise determining, based at least in part on a similarity between the representation and one or more other representations, a cluster. Depending on the type of clustering algorithm used determining the similarity may be different. For example, an embedding model may determine the similarity based on projecting the representation into an embedding space (based on the embedding model's training/internal state), which may be a high-dimensional space. The distance between two embeddings (i.e., projections of two representations into the embedding space) may be an indication of two representations' similarity. In an example where k-medoid clustering is used, medoids equal to the number of clusters, k (a positive integer that may be predefined or that may be based on distance from a current vehicle position, number of objects, complexity of the environment, speed of the vehicle, or the like), may be alternately defined and refined to minimize a distance of representations from a respective medoid. In an example using k-medoid clustering, the medoid may be defined to be one of the representations (i.e., associated with a representative trajectory).

The k-medoid clustering process may comprise iterating choosing new medoids to reduce a squared Euclidean distance between the medoid and other representations indicated as being closest to that medoid. Additionally or alternatively, a representation may be moved to a different cluster to reduce the average squared Euclidean distance between the medoid and the representations in that cluster. In other words, representations may be associated with the closest medoid, thereby being identified being in a same cluster. Note that, in this disclosure, there are instances where a cluster characteristics are discussed regarding a trajectory—it is understood that this may in fact be a representation of the trajectory suitable for clustering, such as a vector or tensor and not control instructions themselves.

To give a very simple illustration of the similarity used by k-medoid clustering, a distance between terminating positions of candidate trajectories may be used, although the clustering may be based on more than just the terminating position. Distances between intermediate positions could additionally or alternatively be used. Additionally or alternatively, the planning component may determine a difference (e.g., dissimilarity in the representation space, distance in the representation space) between intermediate and/or final heading, acceleration, steering rate, velocity, acceleration, displacement along a route, lateral distance from a lane reference, and/or the like. In the simplified example, the candidate trajectories may be reduced to a single data point representing a terminating position associated with each candidate trajectory. One of the candidate trajectories may be selected as the medoid, such as the candidate trajectory associated with terminating position 318 and a distance between terminating position 318 and the other terminating positions 320, 322, and 324 may be determined to determine an average squared Euclidean distance between the terminating positions 320, 322, and 324 to determine whether the terminating position 318 (and candidate trajectory associated therewith) is a suitable medoid and whether the candidate trajectories associated with terminating positions 320, 322, and 324 should be associated with this medoid. Note that although an average square of Euclidean distances is discussed herein, the similarity score associated with a cluster may be any other sum of pairwise dissimilarities such as Euclidean distance, Manhattan distance, Minkowski distance function, or the like.

In an additional or alternate example, k-means may be additionally or alternatively used to conduct the clustering. This is similar to k-medoid, only instead of selecting one of the candidate trajectories/representation thereof as the point to which the dissimilarity is determined for the rest of the representations that are closest to that candidate trajectory/representation (compared to selected points for the other cluster(s)). This point may coincide with a candidate trajectory/representation but that isn't necessarily the case.

At operation 326, example process 300 may comprise determining a first representative trajectory associated with the first cluster based at least in part on determining a similarity between the two or more trajectories of the first cluster. Depending on the type of clustering use, determining the representative trajectory may be based at least in part on the medoid, if k-medoids clustering is used; the cluster centroid, if k-means clustering is used; etc. In the case of k-means, the cluster centroid may be associated with an existing candidate trajectory (i.e., the candidate trajectory has characteristics that match the centroid), although in some cases an extant candidate trajectory may not exist at the centroid. In this case, operation 326 may comprise creating a new candidate trajectory associated with the centroid based at least in part on the tensor or vector defined by the centroid. For example, this vector or tensor may be a numerical representation of intermediate and/or final position(s), heading(s), curvature parameters, etc. and determining this new candidate trajectory may include determining control instructions or a data structure used by the system controller(s) to cause the autonomous vehicle to execute that trajectory. In some examples, the representative trajectory may additionally or alternatively include a probability distribution indicating a distribution of probabilities (or likelihoods) that different trajectories are a medoid of the cluster.

FIG. 3A depicts two representative trajectories. First representative trajectory 328 may be associated with the first cluster 312 and second representative trajectory 330 may be associated with the second cluster 314. These representative trajectories may have been determined using k-medoids meaning they are a candidate trajectories that were selected to be the medoid of their respective cluster.

Turning to FIG. 3B, at operation 332, example process 300 may comprise determining, based at least in part on the sensor data, that a dynamic object exists in an environment associated with the vehicle. In some examples, determining that a dynamic object exists may be accomplished by the perception component. The perception data determined by the perception component may comprise an object classified by the perception component as being dynamic. For example, a dynamic object, which may also be referred to herein as an agent, may comprise a vehicle, a bicyclist, pedestrian, a ball, a wind-blown plastic bag, and/or any other moveable object or object that is likely to move within a time period. An object such as a bench or table may be moveable but, in a time period relevant to operation of the vehicle, is unlikely to move and may be considered a static object.

The perception data may include an indication of the existence of dynamic object(s) in the environment associated with vehicle 202 and may include a dynamic object classification determined by the ML model that handles dynamic object classification. For example, the classification may include whether a dynamic object is passive or reactive and/or a likelihood thereof. As discussed above, an ML model trained to receive an object track associated with a dynamic object, a current state of the vehicle, and/or a candidate action as discussed further herein, and/or sensor data associated with the dynamic object may determine, by a neural network or any of the other ML techniques discussed above, a classification and/or a confidence score (e.g., a posterior probability, a likelihood) that a dynamic object is passive or reactive. In some examples, if the confidence score determined by the ML model meets or exceeds a confidence threshold, the detected object may be classified as a reactive object; otherwise, the detected object may be classified as a passive object. In yet another example the ML model may additionally or alternatively output, from a last layer, the classification itself in addition to or instead of the confidence score.

A passive object may be a dynamic object that is unlikely (e.g., having a confidence score below a confidence score threshold) to change its behavior and/or depend its behavior, at least in part, upon an action of the vehicle 202, whereas a reactive object may be a dynamic object that is likely to change its behavior based on an action of the vehicle 202. In the depicted example, vehicle 126 may be classified as a reactive object based on candidate trajectory(ies) generated by the vehicle 202 and a track associated with the vehicle 126.

At operation 338, example process 300 may comprise determining a predicted movement 334 of the dynamic object based at least in part on the first representative trajectory. In some examples, operation 338 may be executed for all dynamic objects. In another example, operation 338 may be executed for dynamic objects classified as being reactive. Determining the predicted movement may be part of determining a future state of the environment based at least in part on the first representative trajectory 328, according to any of the techniques discussed herein. For the sake of example, the result of predicting movement of a dynamic object based at least in part on the second representative trajectory 330 is also shown as predicted movement 336. Predicted movements 334 and 336 differ since the representative trajectories are sufficiently different, which may be an indication that the respective clusters associated therewith were correctly determined.

In at least one example, determining predicted movement of a dynamic object based at least in part on a representative trajectory may comprise executing the prediction component, which may execute a Kalman filter, machine-learned model, or a simulation. Running a simulation may comprise instantiating the simulation based at least in part on the perception data and the representative trajectory. The instantiation may use a set of template models that may include representations of various objects, such as three different passenger vehicle models, four different pedestrian models, and/or the like, which may be scaled and positioned as appropriate to match the perception data. Any number of different models may exist. In some examples, a template model may comprise a three-dimensional model of a surface of an object without any texturing, although in additional or alternate examples, the model may comprise texture. The template model may comprise a polygon mesh, a triangle mesh, and/or the like. In some examples, models associated with dynamic objects may have a higher polygon count than models associated with static objects. In yet another example, objects in the simulation may be simplified to basic two-dimensional or three-dimensional geometric shapes, corresponding with the dimensionality of the simulation. For example, vehicles and/or pedestrians may be represented as rectangles of different shapes, pedestrians may be represented as cylinders, etc.

In some examples, the instantiated simulated environment may comprise lighting and/or textures, but the techniques described herein work without lighting and/or textures. For two-dimensional simulations, lighting and textures may be eschewed. Moreover, lighting and textures may also be eschewed for three-dimensional simulations. The simulated environment may comprise a model of the vehicle 202 itself. In some examples, instantiating the environment portion of the simulated environment may be based at least in part on map data and/or perception data and objects in the simulated environment may be based at least in part on the a previous prediction in an example where the candidate trajectories generated are for a time period beyond a first time period after a current time, e.g., 2 to 4 seconds, 1 to 2 seconds, etc.

Executing the simulation may comprise controlling a simulated representation of vehicle 202 according to the representative trajectory and based on the simulation instantiation discussed above. Executing the simulation may additionally or alternatively comprise simulating motion of a dynamic object in the simulated environment, such as vehicle 126. Simulating motion of a dynamic object may depend on whether the dynamic object is indicated as being reactive or passive, which may be indicated in the perception data or prediction data. If the agent filter classifies a dynamic object as passive, a Kalman filter or other simpler prediction method may be used to determine a predicted trajectory of the dynamic object. However, if the dynamic object is classified as being reactive, the simulation component may control motion of the dynamic object using a separate instance of the planning component, an agent behavior model (see U.S. patent application Ser. No. 16/889,747), and/or one or more ML models trained to control a simulation of the dynamic object based at least in part on the candidate action. For example, the component that controls simulated movement of the dynamic object may generate commands for controlling the simulated dynamic object based at least in part on the simulated execution of the candidate action by the simulation of vehicle 202. However, in yet another example, the simulation may be a mathematical construct or machine-learned model output based on a track, object classification, and/or disposition (e.g., "conservative," "aggressive," "submissive," "nominal" or the like which may change how assertive the object is in the simulation) associated with vehicle 126 and/or the representative trajectory.

Once the simulation is complete (e.g., upon completing execution of the representative trajectory in the simulation), the resulting predicted track(s) (e.g., position(s), orientation(s), etc. as discussed above) of the object(s) in the environment, including vehicle 202's resultant track from executing the representative trajectory, may be used to determine updated predicted state of the environment for a subsequent simulation associated with a trajectory that was determined based on the representative trajectory or a trajectory in the representative trajectory's cluster (i.e., such as trajectory may be associated with a further time period).

At operation 340, example process 300 may comprise associating the predicted movement 334 with the two or more trajectories of the first cluster 312. The predicted movement 334 may be associated with each of the trajectories of the first cluster 312. Similarly, the predicted movement 336 may be associated with each of the trajectories of the second cluster 314. In some examples, in addition to or instead of a predicted movement, the prediction may comprise a probability distribution and/or multiple predictions based at least in part on altering a potential reactive object response, such as by altering a disposition associated with how the object is modeled in a simulation (e.g., altering the object to be more or less aggressive, paying attention more or less).

At operation 342, example process 300 may comprise determining cost(s) for the two or more trajectories of the first cluster 312 based at least in part on the predicted movement 334. For example, determining cost(s) associated with a second trajectory from among the trajectories of the first cluster 312 may comprise determining a cost map 344 based at least in part on the predicted movement 334. As depicted in FIG. 3B, white space indicates a negligible (less than a threshold) or zero cost and the respective shades indicate, with increasing darkness, increasing costs associated with respective discrete portions of the environment. The black shade indicates a maximum or near-maximum cost (e.g., which may deter the vehicle from causing an impact with another object).

Additionally or alternatively the cost(s) determined in association with the second trajectory may comprise a cost based on static object(s), passive dynamic object(s), reactive dynamic object(s), progress cost(s) (e.g., cost(s) (or rewards) associated with progress made along a route or deviations from the route or target lane), safety cost(s), comfort cost(s), and/or other cost(s). In at least one example, the static object cost(s) may be based at least in part on a non-available roadway surface, such as a cyclist lane, a commuter lane, a parking lane, or the like as discussed in more detail in FIGS. 5A-5C—such a cost may induce the planning component to generally, if not always, select trajectories outside such a lane, except in instances where an impact with an object would otherwise occur (e.g., impact cost(s) may have such a high cost compared to a non-available road surface cost that the planning component may still use the non-available road surface in instances where an impact may occur). In some examples, the dynamic object cost(s) (passive and/or reactive) may include the following cost techniques discussed herein to induce the autonomous vehicle to maintain a time and/or distance gap between the autonomous vehicle and an object in the autonomous vehicle's line of travel.

The static cost(s) and/or dynamic cost(s) may include proximity cost(s). The proximity cost(s) may be based at least in part on a minimum, average, or other distance that the candidate action take the vehicle from a static and/or dynamic object. The safety cost(s) may include a score indicating conformance to rules of the road, proximity to other object(s), and/or proximity to a non-drivable surface (e.g., sidewalk, building, closed lane). The comfort cost(s) may be based at least in part on a jerk and/or acceleration associated with the candidate action and/or whether the candidate action would violate a threshold jerk and/or acceleration. The progress cost(s) may be based at least in part on completion of a mission or sub-goal (e.g., parking at a portion on a block, parking within a block, changing lanes) and/or displacement of the vehicle along the route. For example, the progress cost(s) may reward the further the vehicle would be along the route if the candidate action were executed. A cost that is calculated as a reward may have an opposite sign as the other sub-costs. For example, if there is a positive cost for a candidate action that would violate a comfort metric (e.g., the candidate action would exceed a threshold jerk), a reward may be a negative sub-cost.

In other words, determining the cost associated with a candidate trajectory may include one or more cost components that are based on the predicted movement associated with the cluster into which the candidate trajectory was classified and one or more additional cost(s) that are specific to the particular candidate trajectory (e.g., comfort cost(s), proximity to the reactive object). However, rather than needing to predict a reaction of a reactive object for every candidate trajectory in a cluster, the techniques discussed herein reduce this to a single prediction. In some examples, the cost map 344 may be a cost map indicating a cost associated with occupying a particular space in the environment based on the predicted movement of a reactive object. This cost map may be used for the candidate trajectories of a cluster, such as by adding their cost(s) to other cost maps, such as a cost map that indicates costs for proximity to a static object or a passive dynamic object. By using such a cost map a portion of determining a cost associated with a trajectory may be reduced to totaling the costs indicated in the cost map 344 along a candidate trajectory before summing these costs with trajectory-specific costs, such as a lateral acceleration cost, a longitudinal acceleration cost, a progress cost, and/or the like.

Turning to FIG. 3C, at operation 346, example process 300 may comprise determining, based at least in part on the costs, a lowest cost trajectory of the group of candidate trajectories. Operation 346 may comprise determining a lowest cost candidate trajectory from among all the clusters. In some examples, the trajectory chosen may not be the representative trajectory, as illustrated, since the costs determined in association with the representative trajectory specifically/uniquely may make the representative trajectory more expensive than other candidate trajectories. In some examples, the representative trajectory may end up being the lowest cost trajectory.

In some examples, example process 300 may additionally or alternatively comprise operations 348, 350, 352, and/or 354. At operation 348, example process 300 may comprise determining a second predicted movement of an object based at least in part on the lowest cost trajectory. In other words, if the lowest cost trajectory was not the representative trajectory, operation 348 may include re-executing a prediction to see if the predicted movement (and/or cost(s) associated therewith) change at all and to what extent.

At operation 350, example process 300 may comprise re-determining cost(s) associated with the lowest cost trajectory based at least in part on the second predicted movement. In some examples, operation 350 may occur if the second predicted movement is different than a predicted movement determined in association with the representative trajectory of the cluster to which the lowest cost trajectory belongs.

At operation 352, example process 300 may comprise determining whether the re-determined cost(s) are within a tolerance and/or below a threshold. The tolerance may specify a permitted amount by which the re-determined cost(s) may vary/be different from the originally determined costs in association with the lowest cost trajectory at operation 342. Additionally or alternatively, operation 352 may comprise determining whether the re-determined cost(s) are below a threshold cost. The threshold cost may be a predetermined cost or may be based at least in part on an original cost of the lowest cost trajectory or one or more costs of other candidate trajectories.

If the re-determined cost meets or exceeds a tolerance or the cost threshold, example process 300 may transition to operation 354. At operation 354, example process 300 may comprise excluding the lowest cost trajectory from the group of candidate trajectories and returning to operation 346 to determine a new lowest cost trajectory.

If the re-determined cost is within the tolerance and/or below the cost threshold, example process 300 may transition to operation 356. At operation 356, example process 300 may comprise controlling the vehicle based at least in part on the lowest cost trajectory. In the illustrated example, a trajectory 358 from the second cluster 314 is illustrated as being selected to control motion of the vehicle 202.

In an additional or alternate example, a subsequent set of candidate trajectories may be generated based at least in part on the trajectory 358 selected at operation 346 and/or 352, such as when a time horizon has not been met yet (e.g., candidate trajectories haven't been generated in association with a last time period yet, such as a time period that ends at the time horizon, e.g., 5 seconds, 8 seconds, 10 seconds, any other time). In such an example, the trajectory 358 may be selected to be part of a path being generated by the planning component to control the vehicle 202 and/or the example process 300 may return to operation 304. The trajectory 358 may be associated with controlling the vehicle over a first time period and the subsequent set of candidate trajectories may be associated with a second time period after the first time period. For example, the first time period may be from a current time to 0.5 seconds, 1 second, or 2 seconds in the future (any other period is contemplated and may depend on the control time horizon) and the second time period may be from 0.5 seconds, 1 second, or 2 seconds in the future, depending on when the first time period ended, to 1 second, 2 seconds, or 4 seconds in the future, respectively.

Alternate Clustering Technique

Figure 4:
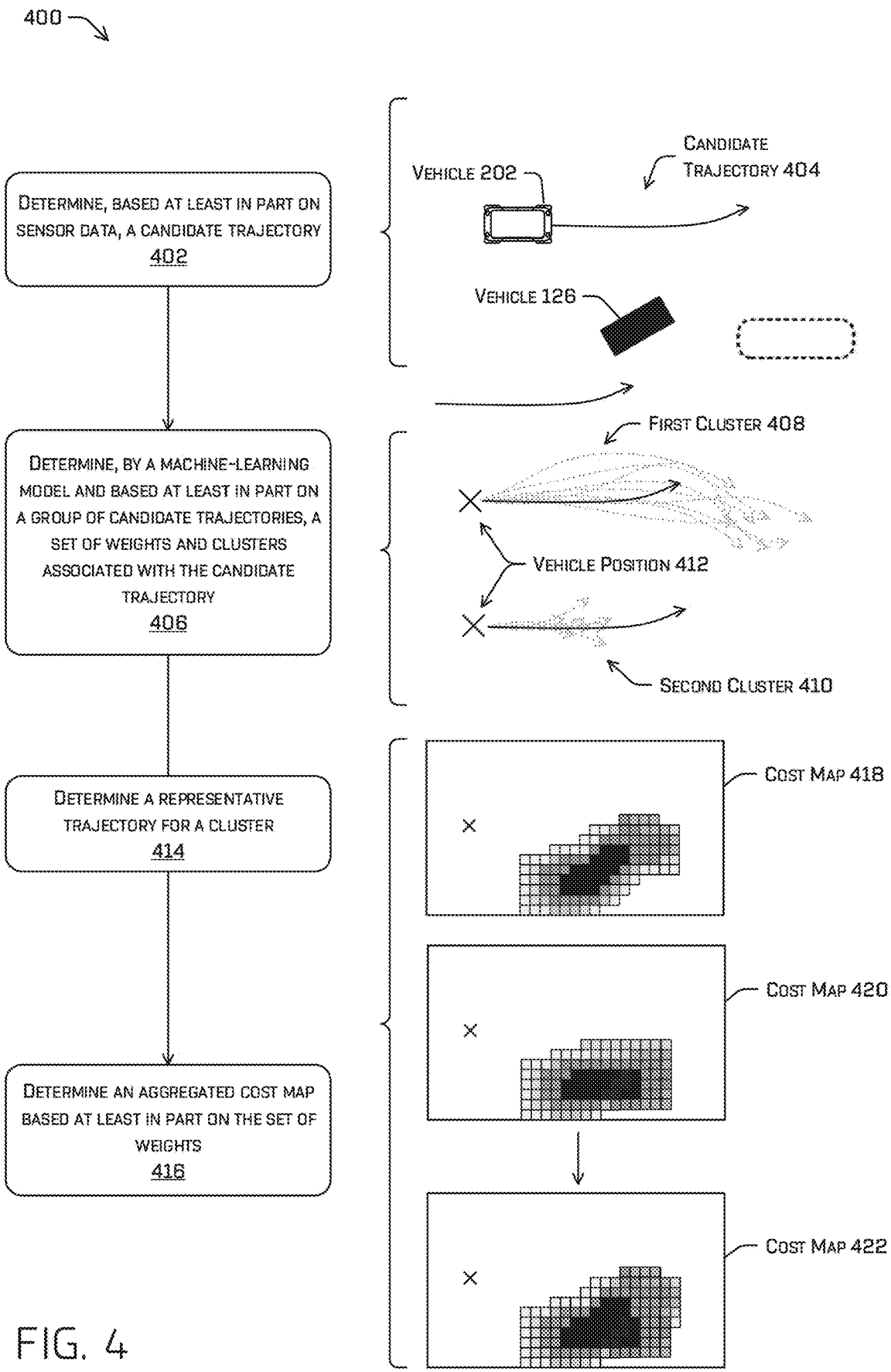
FIG. 4 illustrates an additional or alternate example clustering process including a machine-learned model that maps a candidate trajectory to multiple clusters and determines a set of weights that may be used to aggregate cost maps associated with the different clusters in determining a cost associated with the trajectory or a representative trajectory.

FIG. 4 illustrates an additional or alternate clustering example process 400 including a machine-learned model that maps a candidate trajectory to multiple clusters and determines a set of weights that may be used to aggregate cost maps associated with the different clusters in determining a cost associated with the trajectory or a representative trajectory. Example process 400 may be part of or replace operation(s) 304, 310, 326, and/or 342 of example process 300. Example process 400 may be implemented at all times or when a scene complexity (see U.S. patent application Ser. No. 17/184,559), detected number of objects, vehicle speed meets or exceeds a threshold. Additionally or alternatively, example process 400 may be implemented based at least in part on determining a difference between two candidate trajectories and determining a difference between two predictions associated respectively with the two candidate trajectories. If the difference between the candidate trajectories is less than a threshold and the difference between the predictions is equal to or greater than a threshold, then example process 400 may be implemented. In other words, if small differences in trajectories result in large differences in the resultant prediction, example process 400 may be implemented. This difference may be a dissimilarity function, such as Euclidean distance, squared Euclidean distance, Manhattan distance, Minkowski distance function, or the like.

At operation 402, example process 400 may comprise determining, based at least in part on sensor data, a candidate trajectory 404. Candidate trajectory 404 may be one of the trajectories in the group of candidate trajectories 306.

At operation 406, example process 400 may comprise determining, by an ML model and based at least in part on a group of candidate trajectories, a set of weights and clusters associated with the candidate trajectory. In other words, example process 400 may comprise associating a candidate trajectory with the p number of closest clusters instead of a single cluster where p is a positive integer greater than 1. The integer p may be static or may be dynamically set based at least in part on a difference between two predictions associated with two candidate predictions that are similar (e.g., have a difference that is less than a threshold), a scene complexity, a number of objects in the environment, or the like. For example, p is 2 in the depicted example and the candidate trajectory 404 has been associated with a first cluster 408 and a second cluster 410. A position 412 of vehicle 202 is illustrated as an "x" in the figures for reference.

Operation 406 may additionally include determining a weight associated with each cluster to which a candidate trajectory is associated. The weight may be based at least in part on a dissimilarity between the candidate trajectory and the cluster or cluster centroid, medoid, or the like.

At operation 414, example process 400 may comprise determining a representative trajectory for a cluster, e.g., similarly to operation 326 of example process 300.

At operation 416, example process 400 may comprise determining an aggregated cost map as part of determining a cost of a specific candidate trajectory based at least in part on the weights associated with that candidate trajectory. For example, cost map 418 may be determined based at least in part on predicting a dynamic object's reaction to a first representative trajectory associated with the first cluster 408. Cost map 420 may be determined based at least in part on predicting a dynamic object's reaction to a second representative trajectory associated with the second cluster 410. Since the candidate trajectory 404 has been associated with both the first cluster 408 and second cluster 410 instead of just using one or the other cost map, operation 416 may include determining an aggregated cost map 422 based at least in part on the weights determined at operation 406. For example, the costs indicated by a cost map 418 may be scaled based at least in part on a first weight associated with the candidate trajectory 404's association with the first cluster. After the cost maps have been scaled they may be summed or otherwise combined (e.g., taking the highest cost between the cost maps for a respective discrete portion of the map) in a manner that accounts for the weights to determine the aggregated cost map. This aggregated cost map may then be used for, at least, the dynamic object (or reactive dynamic object) cost determination for the candidate trajectory. In an additional or alternate example, the cost map associated with the highest weight may be used instead of combining the cost maps.

Example Additional or Alternate Cost Function

Figure 5A:
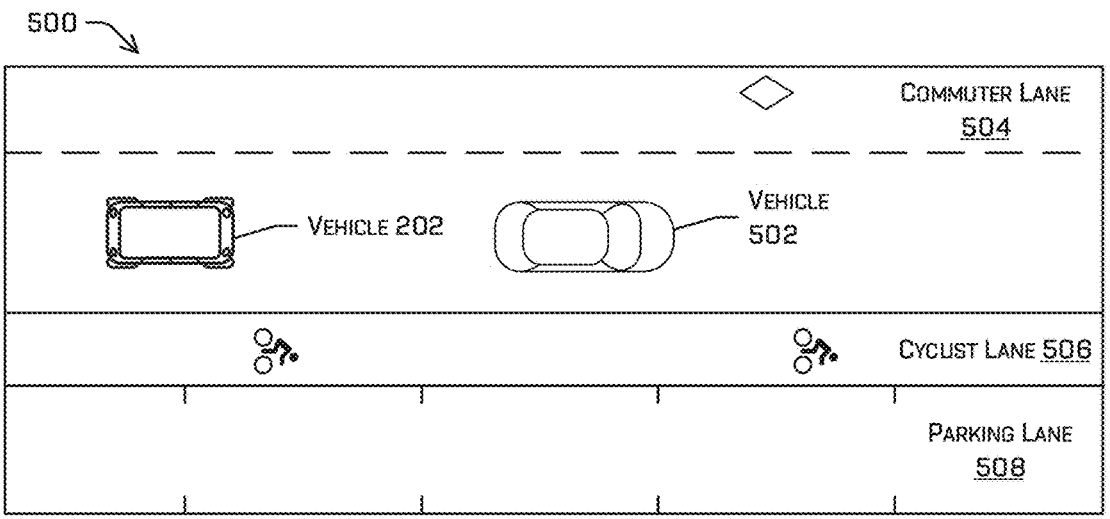
FIGS. 5A-5C depict an example scenario and cost map associated therewith in which a conditional-use roadway surface cost and/or following cost may be determined to prompt the vehicle to stay out of conditional-use roadway surfaces and/or to follow another vehicle at a particular time and/or distance.

FIG. 5A depicts an example scenario 500 for which additional costs may be determined in determining a cost associated with a candidate trajectory. For example, the cost(s) discussed herein may be determined in addition to or instead of the predicted movement cost map discussed above for dynamic object(s). In particular, FIG. 5A illustrates a scenario in which cost(s) may be determined to induce the vehicle 202 to follow an object, such as vehicle 502, and/or cost(s) to induce the vehicle 202 to avoid or to be permitted to use various conditional-use roadway surfaces, such as a commuter lane 504, cyclist lane 506, and/or parking lane 508.

In order to induce, rather than to directly encode a rule or to send a direct command to the vehicle controller, the vehicle 202 to maintain a time gap or distance gap between the vehicle 202 position and a position of an object in the direction of travel of the vehicle, a cost map and/or set of costs may be determined as discussed herein. The time gap may be tolled from the time an object crosses a point to the time the vehicle 202 cross that same point. Measuring this gap in time accounts for variations in speed between the vehicle 202 and/or the object. To induce the vehicle 202 to maintain a time gap (e.g., for safety, to increase a number of options that the vehicle 202 has), a planning component of the vehicle 202 may determine a position of the vehicle 202 (e.g., according to SLAM techniques for a current position of the vehicle 202 or a planned position of the vehicle according to a candidate trajectory, as discussed above).

Figure 5B:
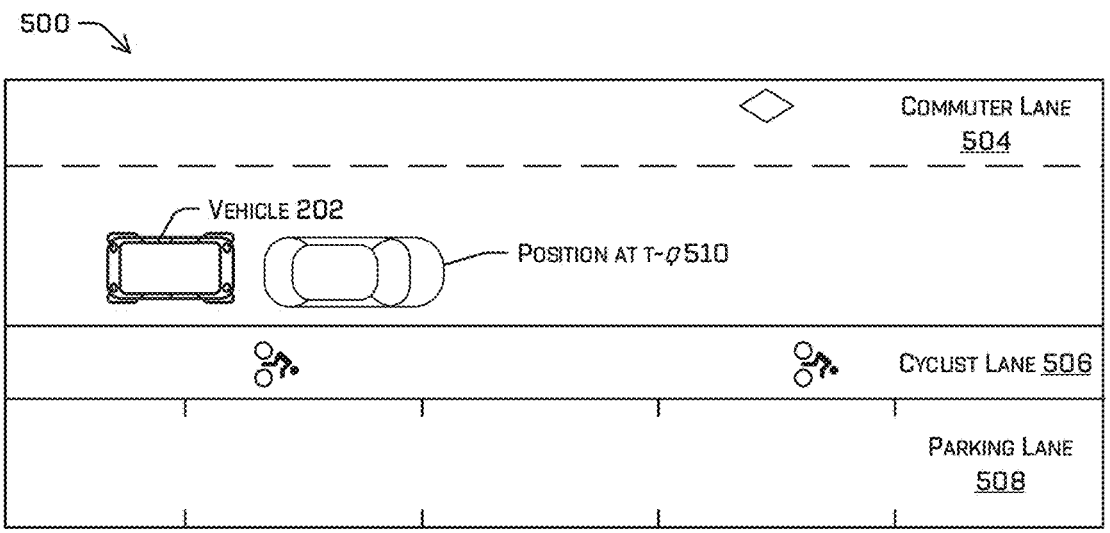

The planning component may receive a track associated with an object that is partially or completely within a drive corridor (see U.S. patent application Ser. No. 16/588,529 filed Sep. 30, 2019, the entirety of which is incorporated herein) and may determine that object's position in the past. For example, the time period may be q number of seconds, where q is a positive real number. The planning component may determine a position of and/or space occupied by the object q seconds into the past. FIG. 5B depicts a position of such an object, vehicle 502, at time t−q.

Figure 5C:
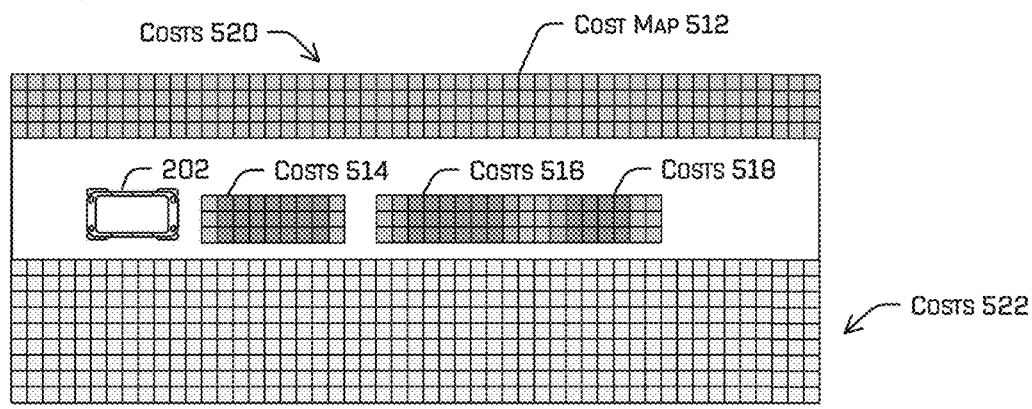

The planning component may determine a cost map or set of costs associated with the position and/or space occupied by the object at time t−q (510), such that candidate trajectories that terminate at that space or pass through onto the other side of that space are penalized. For example, FIG. 5C depicts a cost map 512 including costs 514, which are associated with the space in the environment occupied by the vehicle 502 at time t−q. The costs in the cost map 512 may further include costs associated with a current position of the vehicle 502, costs 516; and costs associated with a predicted track and/or position of the vehicle, costs 518. Note that costs 512 and 514 may be represented in a first cost map associated with a first time (e.g., a current time, a first time period) and costs 518 may be represented in a cost map associated with a second time later than the first time (e.g., a future time, a second time period subsequent to the first time) in a design where predictions are associated with additional cost maps.

The cost map 512 may further include costs associated with conditional-use roadway surfaces to induce the vehicle to stay off of conditional-use roadway surfaces unless absolutely necessary. Costs 520 are associated with commuter lane 504 and costs 522 are associated with cyclist lane 506 and parking lane 508. In some examples, the cost associated with a conditional-use roadway surface may have a base cost. The base cost may be modified based at least in part on sensor data. For example, the base cost for commuter lane 504 may be relatively high when the vehicle 202 detects that that a sufficient number of passengers to meet a passenger requirement to use the commuter lane 504 isn't met, but this base cost may be reduced to zero if the vehicle 202 detects that a sufficient number of passengers is present in the vehicle 202. Similarly, the vehicle 202 may modify (e.g., multiply, add a scalar value to) a base cost associated with a cyclist lane 506 or parking lane 508 if object(s) are present in either. Having some base cost associated with these sorts of lane may prevent the vehicle 202 from entering those lanes as if they were a normal lane. However, the cost may be set at a moderate enough amount that, if there were a disabled vehicle in all other available lanes (or some other obstruction), the vehicle 202 could use part or all of a cyclist lane or parking lane to get around the obstruction.

It is understood that, although FIGS. 5A and 5B illustrate a commuter lane, cyclist lane, and parking lane, other times of conditional-use roadway surfaces exist, such as reversible lanes, which may be heavily costed or removed from the map as being identified as a drivable surface when they are detected as being reversed compared to a direction of travel of the vehicle 202; toll lanes; rough-surface roadway (e.g., a portion of roadway that is under construction but is legally drivable, but may just be rougher or include bumps, for example); or the like.

Example Clauses

A. A method comprising: receiving sensor data from a sensor; determining, based at least in part on the sensor data, a group of candidate trajectories for controlling a vehicle; determining, based at least in part on the group of candidate trajectories, at least a first cluster and a second cluster, the first cluster associated with two or more trajectories from among the group of candidate trajectories; determining a representative trajectory associated with the two or more trajectories of the first cluster based at least in part on determining a similarity between the two or more trajectories; determining, based at least in part on the representative trajectory, a predicted movement of an object proximate the vehicle; associating the predicted movement of the dynamic object with the two or more trajectories; determining, based at least in part on the predicted movement, a trajectory from among the group of candidate trajectories; and controlling the vehicle using the trajectory.

B. The method of claim A, wherein determining the representative trajectory is based at least in part on a medoid of the first cluster.

C. The method of claim A or B, wherein the group of candidate trajectories is a second group of candidate trajectories generated to control the vehicle in association with at least one of: a future time period later than a time period associated with a first group of candidate trajectories, or a second distance further from the vehicle than a first distance associated with the first group of candidate trajectories.

D. The method of any one of claims A-C, wherein determining the first cluster and the second cluster is based at least in part on k-medoids clustering, where k is a positive integer; and wherein the method further comprises determining k based at least in part on at least one of a number of candidate trajectories in the group of candidate trajectories, map data, a similarity between two trajectories of a cluster, or an object track associated with an object in the environment, wherein the object track indicates at least one of a historical, current, or predicted at least one of position, heading, or velocity of the object.

E. The method of any one of claims A-D, wherein determining the first cluster and the second cluster comprises: determining to associate the trajectory with the first cluster and the second cluster; and determining, based at least in part on the trajectory and candidate trajectories associated with the first cluster and the second cluster, a first weight to the association of the trajectory with the first cluster and a second weight to the association of the trajectory with the second cluster.

F. The method of any one of claims A-E, wherein determining the trajectory based at least in part on the predicted movement comprises: determining costs associated with the two or more trajectories based at least in part on the predicted movement; and determining that the trajectory is a lowest cost trajectory from among the group of candidate trajectories.

G. A system comprising: one or more processors; and a memory storing processor-executable instructions that, when executed by the one or more processors, cause the system to perform operations comprising: receiving sensor data from a sensor; determining, based at least in part on the sensor data, a group of candidate trajectories for controlling a vehicle; determining, based at least in part on the group of candidate trajectories, at least a first cluster and a second cluster, the first cluster associated with two or more trajectories from among the group of candidate trajectories; determining a representative trajectory associated with the two or more trajectories of the first cluster based at least in part on determining a similarity between the two or more trajectories; determining, based at least in part on the representative trajectory, a predicted movement of an object proximate the vehicle; associating the predicted movement of the dynamic object with the two or more trajectories; determining costs associated with the two or more trajectories based at least in part on the predicted movement; determining, based at least in part on the costs, a lowest cost trajectory of the group of candidate trajectories; and controlling the vehicle using the lowest cost trajectory.

H. The system of claim G, wherein determining the representative trajectory is based at least in part on a medoid of the first cluster.

I. The system of claim G or H, wherein the group of candidate trajectories is a second group of candidate trajectories generated to control the vehicle in association with at least one of: a future time period later than a time period associated with a first group of candidate trajectories, or a second distance further from the vehicle than a first distance associated with the first group of candidate trajectories.

J. The system of any one of claims G-I, wherein determining the first cluster and the second cluster is based at least in part on k-medoids clustering, where k is a positive integer.

K. The system of claim J, wherein the operations further comprise determining k based at least in part on at least one of a number of candidate trajectories in the group of candidate trajectories, map data, a similarity between two trajectories of a cluster, or an object track associated with an object in the environment, wherein the object track indicates at least one of a historical, current, or predicted at least one of position, heading, or velocity of the object.

L. The system of any one of claims G-K, wherein determining the first cluster and the second cluster comprises: determining to associate the lowest cost trajectory with the first cluster and the second cluster; and determining, based at least in part on the trajectory and candidate trajectories associated with the first cluster and the second cluster, a first weight to the association of the lowest cost trajectory with the first cluster and a second weight to the association of the lowest cost trajectory with the second cluster.

M. The system of any one of claims G-L, wherein the operations further comprise further comprising parameterizing the lowest cost trajectory as a set of at least one of a displacements along a route, lateral distances from a reference point associated with the route, or times, wherein the machine-learned model associates a first weight with displacement and a second weight with lateral distance.

N. A non-transitory computer-readable medium storing processor-executable instructions that, when executed by one or more processors, cause one or more processors to perform operations comprising: receiving sensor data from a sensor; determining, based at least in part on the sensor data, a group of candidate trajectories for controlling a vehicle; determining, based at least in part on the group of candidate trajectories, at least a first cluster and a second cluster, the first cluster associated with two or more trajectories from among the group of candidate trajectories; determining a representative trajectory associated with the two or more trajectories of the first cluster based at least in part on determining a similarity between the two or more trajectories; determining costs associated with the two or more trajectories based at least in part on the representative trajectory; determining, based at least in part on the costs, a lowest cost trajectory of the group of candidate trajectories; and controlling the vehicle using the lowest cost trajectory.

O. The non-transitory computer-readable medium of claim N, wherein determining the costs comprises: determining, based at least in part on the representative trajectory, a predicted movement of an object proximate the vehicle; associating the predicted movement of the dynamic object with the two or more trajectories; and determining a cost associated with one of the two or more trajectories based at least in part on the predicted movement.

P. The non-transitory computer-readable medium of claim N or O, wherein determining the representative trajectory is based at least in part on a medoid of the first cluster.

Q. The non-transitory computer-readable medium of any one of claims N-P, wherein the group of candidate trajectories is a second group of candidate trajectories generated to control the vehicle in association with at least one of: a future time period later than a time period associated with a first group of candidate trajectories, or a second distance further from the vehicle than a first distance associated with the first group of candidate trajectories.

R. The non-transitory computer-readable medium of any one of claims N-Q, wherein: determining the first cluster and the second cluster is based at least in part on k-medoids clustering, where k is a positive integer.

S. The non-transitory computer-readable medium of claim R, wherein the operations further comprise determining k based at least in part on at least one of a number of candidate trajectories in the group of candidate trajectories, map data, a similarity between two trajectories of a cluster, or an object track associated with an object in the environment, wherein the object track indicates at least one of a historical, current, or predicted at least one of position, heading, or velocity of the object.

T. The non-transitory computer-readable medium of any one of claims N-S, wherein determining the first cluster and the second cluster comprises: determining to associate the lowest cost trajectory with the first cluster and the second cluster; and determining, based at least in part on the lowest cost trajectory and candidate trajectories associated with the first cluster and the second cluster, a first weight to the association of the lowest cost trajectory with the first cluster and a second weight to the association of the lowest cost trajectory with the second cluster.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
    receiving sensor data from a sensor;
    determining, based at least in part on the sensor data, a group of candidate trajectories for controlling a vehicle in an environment;
    determining, based at least in part on the group of candidate trajectories, at least a first cluster and a second cluster, the first cluster associated with two or more trajectories from among the group of candidate trajectories;
    determining a representative trajectory associated with the two or more trajectories of the first cluster based at least in part on determining a similarity between the two or more trajectories, wherein the representative trajectory is a trajectory that represents the two or more trajectories of the first cluster;
    determining, based at least in part on the representative trajectory, a predicted movement of an object in the environment;
    associating the predicted movement of the object with the two or more trajectories;
    determining, based at least in part on the predicted movement, a trajectory from among the group of candidate trajectories; and
    controlling the vehicle using the trajectory.

2. The method of claim 1, wherein determining the representative trajectory is based at least in part on a medoid of the first cluster.

3. The method of claim 1, wherein the group of candidate trajectories is a second group of candidate trajectories generated to control the vehicle in association with at least one of:
    a future time period later than a time period associated with a first group of candidate trajectories, or
    a second distance further from the vehicle than a first distance associated with the first group of candidate trajectories.

4. The method of claim 1, wherein determining the first cluster and the second cluster is based at least in part on k-medoids clustering, where k is a positive integer; and
    wherein the method further comprises determining k based at least in part on at least one of a number of candidate trajectories in the group of candidate trajectories, map data, a similarity between two trajectories of a cluster, or an object track associated with the object, wherein the object track indicates at least one of a historical, current, or predicted at least one of position, heading, or velocity of the object.

5. The method of claim 1, wherein determining the first cluster and the second cluster comprises:
    determining to associate the trajectory with the first cluster and the second cluster; and
    determining, based at least in part on the trajectory and candidate trajectories associated with the first cluster and the second cluster, a first weight to the association of the trajectory with the first cluster and a second weight to the association of the trajectory with the second cluster.

6. The method of claim 1, wherein determining the trajectory based at least in part on the predicted movement comprises:
    determining costs associated with the two or more trajectories based at least in part on the predicted movement; and
    determining that the trajectory is a lowest cost trajectory from among the group of candidate trajectories.

7. A system comprising:
    one or more processors; and
    a memory storing processor-executable instructions that, when executed by the one or more processors, cause the system to perform operations comprising:
        receiving sensor data from a sensor;
        determining, based at least in part on the sensor data, a group of candidate trajectories for controlling a vehicle in an environment;
        determining, based at least in part on the group of candidate trajectories, at least a first cluster and a second cluster, the first cluster associated with two or more trajectories from among the group of candidate trajectories;
        determining a representative trajectory associated with the two or more trajectories of the first cluster based at least in part on determining a similarity between the two or more trajectories, the representative trajectory being a trajectory that represents the two or more trajectories of the first cluster;

determining, based at least in part on the representative trajectory, a predicted movement of an object in the environment;

associating the predicted movement of the object with the two or more trajectories;

determining costs associated with the two or more trajectories based at least in part on the predicted movement;

determining, based at least in part on the costs, a lowest cost trajectory of the group of candidate trajectories; and controlling the vehicle using the lowest cost trajectory.

8. The system of claim 7, wherein determining the representative trajectory is based at least in part on a medoid of the first cluster.

9. The system of claim 7, wherein the group of candidate trajectories is a second group of candidate trajectories generated to control the vehicle in association with at least one of:
a future time period later than a time period associated with a first group of candidate trajectories, or
a second distance further from the vehicle than a first distance associated with the first group of candidate trajectories.

10. The system of claim 7, wherein determining the first cluster and the second cluster is based at least in part on k-medoids clustering, where k is a positive integer.

11. The system of claim 10, wherein the operations further comprise determining k based at least in part on at least one of a number of candidate trajectories in the group of candidate trajectories, map data, a similarity between two trajectories of a cluster, or an object track associated with the object, wherein the object track indicates at least one of a historical, current, or predicted at least one of position, heading, or velocity of the object.

12. The system of claim 7, wherein determining the first cluster and the second cluster comprises:
determining to associate the lowest cost trajectory with the first cluster and the second cluster; and
determining, based at least in part on the trajectory and candidate trajectories associated with the first cluster and the second cluster, a first weight to the association of the lowest cost trajectory with the first cluster and a second weight to the association of the lowest cost trajectory with the second cluster.

13. The system of claim 7, wherein the operations further comprise parameterizing the lowest cost trajectory as a set of at least one of a displacements along a route, lateral distances from a reference point associated with the route, or times, wherein a machine-learned model determines a first weight with displacement and a second weight with lateral distance.

14. A non-transitory computer-readable medium storing processor-executable instructions that, when executed by one or more processors, cause one or more processors to perform operations comprising:
receiving sensor data from a sensor;
determining, based at least in part on the sensor data, a group of candidate trajectories for controlling a vehicle in an environment;
determining, based at least in part on the group of candidate trajectories, at least a first cluster and a second cluster, the first cluster associated with two or more trajectories from among the group of candidate trajectories;
determining a representative trajectory associated with the two or more trajectories of the first cluster based at least in part on determining a similarity between the two or more trajectories, the representative trajectory being a trajectory that represents the two or more trajectories of the first cluster;
determining costs associated with the two or more trajectories based at least in part on the representative trajectory;
determining, based at least in part on the costs, a lowest cost trajectory of the group of candidate trajectories; and
controlling the vehicle using the lowest cost trajectory.

15. The non-transitory computer-readable medium of claim 14, wherein determining the costs comprises:
determining, based at least in part on the representative trajectory, a predicted movement of an object in the environment;
associating the predicted movement of the object with the two or more trajectories; and
determining a cost associated with one of the two or more trajectories based at least in part on the predicted movement.

16. The non-transitory computer-readable medium of claim 14, wherein determining the representative trajectory is based at least in part on a medoid of the first cluster.

17. The non-transitory computer-readable medium of claim 14, wherein the group of candidate trajectories is a second group of candidate trajectories generated to control the vehicle in association with at least one of:
a future time period later than a time period associated with a first group of candidate trajectories, or
a second distance further from the vehicle than a first distance associated with the first group of candidate trajectories.

18. The non-transitory computer-readable medium of claim 14, wherein determining the first cluster and the second cluster is based at least in part on k-medoids clustering, where k is a positive integer.

19. The non-transitory computer-readable medium of claim 18, wherein the operations further comprise determining k based at least in part on at least one of a number of candidate trajectories in the group of candidate trajectories, map data, a similarity between two trajectories of a cluster, or an object track associated with an object in the environment, wherein the object track indicates at least one of a historical, current, or predicted at least one of position, heading, or velocity of the object.

20. The non-transitory computer-readable medium of claim 14, wherein determining the first cluster and the second cluster comprises:
determining to associate the lowest cost trajectory with the first cluster and the second cluster; and
determining, based at least in part on the lowest cost trajectory and candidate trajectories associated with the first cluster and the second cluster, a first weight to the association of the lowest cost trajectory with the first cluster and a second weight to the association of the lowest cost trajectory with the second cluster.

* * * * *